United States Patent [19]

Takagi

[11] Patent Number: 5,576,798
[45] Date of Patent: Nov. 19, 1996

[54] AUTOMATIC FLASH AMOUNT CONTROL APPARATUS OF CAMERA

[75] Inventor: Tadao Takagi, Yokohama, Japan

[73] Assignee: Nikon Corporation, Tokyo, Japan

[21] Appl. No.: 411,910

[22] Filed: Mar. 28, 1995

Related U.S. Application Data

[63] Continuation of Ser. No. 266,301, Jun. 27, 1994, abandoned, which is a continuation of Ser. No. 112,051, Aug. 26, 1993, abandoned, which is a continuation of Ser. No. 899,643, Jun. 19, 1992, abandoned, which is a continuation-in-part of Ser. No. 789,967, Nov. 12, 1991, Pat. No. 5,172,157.

[30] Foreign Application Priority Data

Jun. 20, 1991 [JP] Japan ..................... 3-176136

[51] Int. Cl.⁶ ..................... G03B 15/05
[52] U.S. Cl. ............. 396/159; 396/157; 396/166; 396/234
[58] Field of Search ............... 354/413, 414, 354/415, 416, 417, 432

[56] References Cited

U.S. PATENT DOCUMENTS

| | | | |
|---|---|---|---|
| 4,429,969 | 2/1984 | Saegusa | 354/414 |
| 4,441,797 | 4/1984 | Maruyama et al. | 354/416 |
| 4,542,975 | 9/1985 | Ishida et al. | 354/416 |
| 4,705,382 | 11/1987 | Mukai et al. | 354/416 |
| 4,782,357 | 11/1988 | Hayakawa et al. | 354/414 |
| 4,809,030 | 2/1989 | Takagi et al. | 354/422 |
| 4,965,620 | 10/1990 | Takagi et al. | 354/416 |
| 5,006,879 | 4/1991 | Takagi et al. | 354/413 |
| 5,164,759 | 11/1992 | Yasukawa | 354/415 |
| 5,168,300 | 12/1992 | Yasukawa | 354/415 |
| 5,172,157 | 12/1992 | Takagi | 354/415 |
| 5,218,397 | 6/1993 | Takagi | 354/415 |
| 5,243,376 | 9/1993 | Yokonuma | 354/413 |

Primary Examiner—Russell E. Adams
Attorney, Agent, or Firm—Shapiro and Shapiro

[57] ABSTRACT

An automatic flash amount control apparatus of camera, which can avoid over-exposure of a subject to be controlled in flash amount even if the subject to be illuminated occupies only a small portion of photo-taking screen, executes photo-metering of a field to be photographed while dividing the field into a plurality of first metering regions without flashing of a flashing device and meters an optical flux emitted by the flashing device and then reflected by the field to be photographed while dividing the flux into a plurality of second metering regions. The apparatus separates the second metering regions into two groups, one of which is to contribute to and the other of which is not to contribute to flash amount control, with correspondence to respective results of metering of the first metering regions. Upon flashing of the flashing device, an amount of flash of the flashing device is controlled according to results of metering of the second metering regions which have been determined to contribute to the flash amount control.

12 Claims, 29 Drawing Sheets

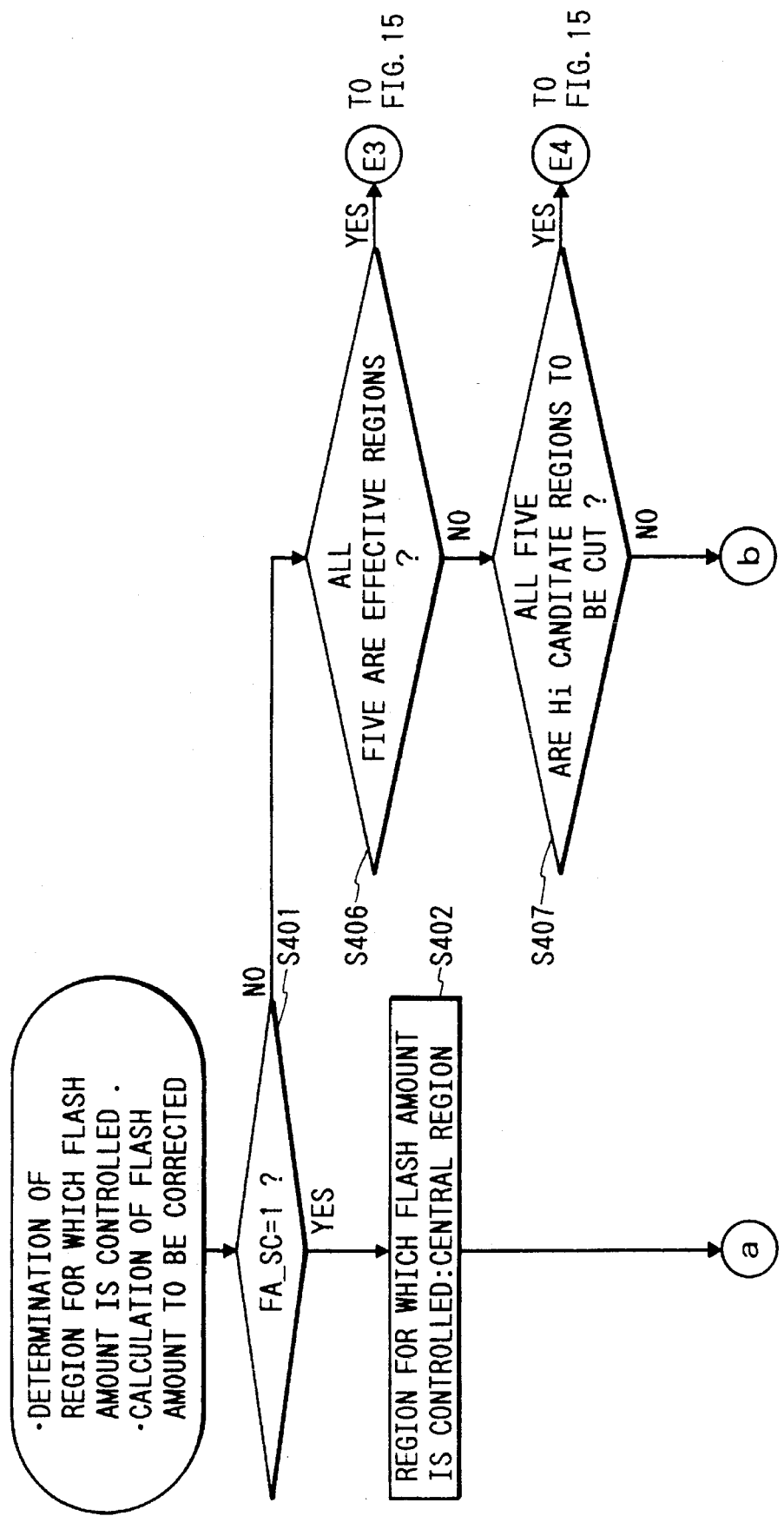

FIG. 23

| ENCODER POSITION | NOMINAL DISTANCE | FOCUSING LENGTH | | | | | | | | | | | | | |
|---|---|---|---|---|---|---|---|---|---|---|---|---|---|---|
| | | 35 | | 37 | | 40 | | ... | 70 | | |
| | | FAR | CLOSE | FAR | CLOSE | FAR | CLOSE | FAR | FAR | CLOSE |
| 1 | 7.55 | 9.9 | 0.7 | 9.9 | 0.5 | 9.9 | 0.5 | 9. | 9.9 | 0.2 |
| 2 | 5.66 | 0.5 | 0.5 | 0.4 | 0.4 | 0.4 | 0.4 | 0. | 0.2 | 0.2 |
| 3 | 4.76 | 0.4 | 0.4 | 0.3 | 0.3 | 0.3 | 0.3 | | 0.1 | 0.1 |
| 4 | 4.00 | 0.3 | 0.3 | 0.3 | 0.3 | 0.3 | 0.3 | | 0.1 | 0.1 |
| 5 | 3.36 | 0.3 | 0.3 | 0.3 | 0.3 | 0.2 | 0.2 | | 0.1 | 0.1 |
| 6 | 2.83 | 0.2 | 0.2 | 0.2 | 0.2 | 0.2 | 0.2 | | 0.1 | 0.1 |
| 7 | 2.38 | 0.2 | 0.2 | 0.2 | 0.2 | 0.2 | 0. | | 0.1 | 0.1 |
| 8 | 2.00 | 0.2 | 0.2 | 0.1 | 0.1 | 0.1 | 0. | | 0.1 | 0.1 |
| 9 | 1.68 | 0.1 | 0.1 | 0.1 | 0.1 | 0.1 | | | 0.1 | 0.1 |
| 10 | 1.41 | 0.1 | 0.1 | 0.1 | 0.1 | 0.1 | | | 0.1 | 0.1 |
| 11 | 1.19 | 0.1 | 0.1 | 0.1 | 0.1 | | | | 0.1 | 0.1 |
| 12 | 1.00 | 0.1 | 0.1 | 0.1 | 0.1 | | | | 0.1 | 0.1 |
| 13 | 0.84 | 0.1 | 0.1 | 0.1 | 0.1 | | | | 0.1 | 0.1 |
| 14 | 0.71 | 0.1 | 0.1 | 0.1 | 0.1 | | | | 0.1 | 0.1 |
| 15 | 0.60 | 0.1 | 0.1 | 0.1 | 0.1 | | | | 0.1 | 0.1 |
| 16 | 0.50 | 0.1 | 9.9 | 0.1 | 9. | | | | 0.1 | 9.9 |

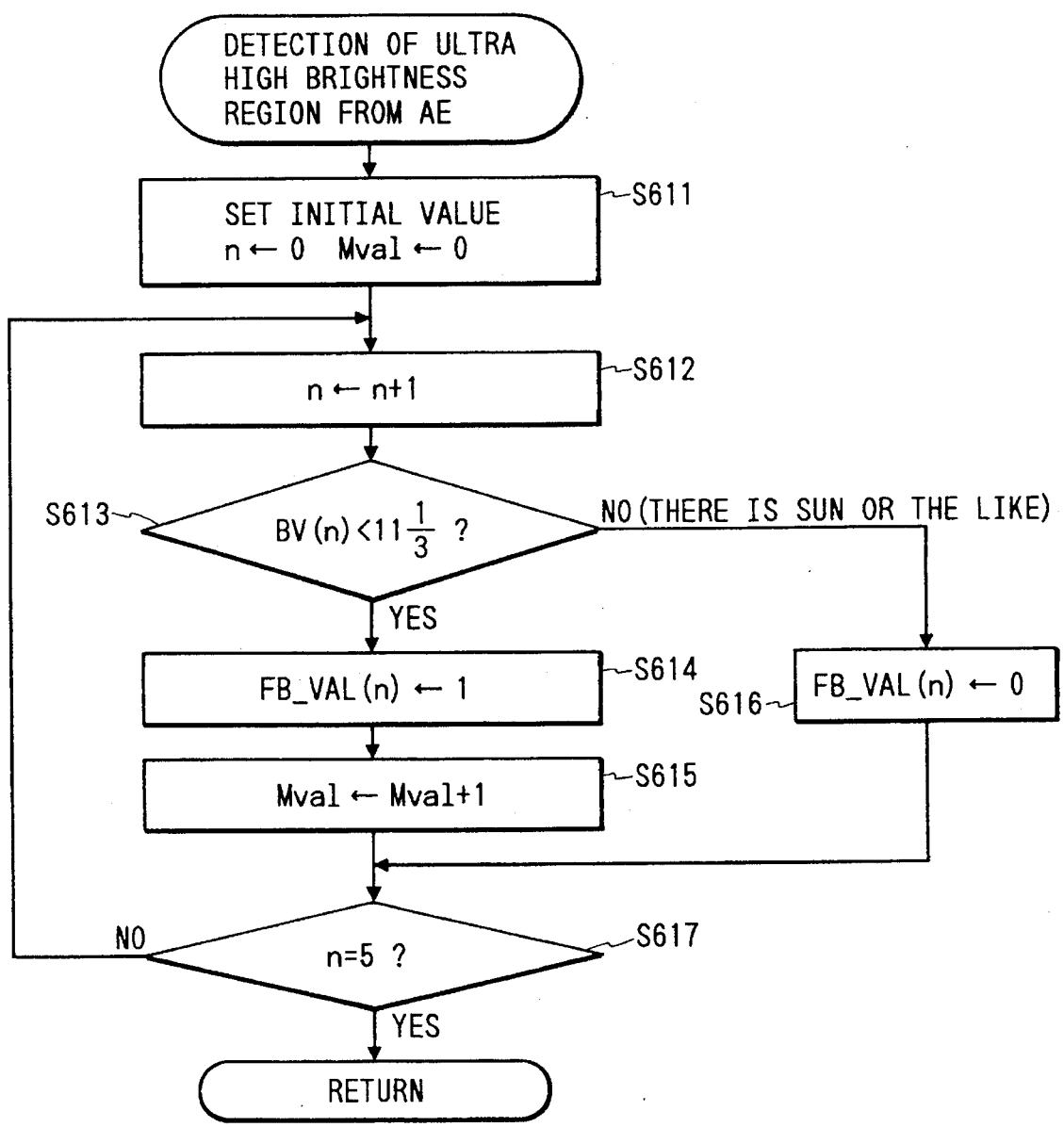

AUTOMATIC FLASH AMOUNT CONTROL APPARATUS OF CAMERA

This is a continuation of application Ser. No. 08/266,301 filed Jun. 27, 1994 (abandoned), which is a continuation of application Ser. No. 08/112,051 filed Aug. 26, 1993 (abandoned), which is a continuation of application Ser. No. 07/899,643 filed Jun. 16, 1992 (abandoned), which is a continuation-in-part of application Ser. No. 07/789,967 filed Nov. 12, 1991 (now U.S. Pat. No. 5,172,157 issued Dec. 15, 1992).

BACKGROUND OF THE INVENTION

1. Field of the Invention

The present invention relates to an automatic flash amount control apparatus of camera which meters a flash amount with a field to be photographed being divided into a plurality of regions so as to execute flash amount control according to results of the metering.

2. Related Background Art

Suppose that synchro-flash photography is carried out in the daytime with a camera having a TTL automatic flash amount control apparatus. If there exists an object with high brightness such as the sun or the like in a portion of a photographic screen, a flash amount of an electronic flash device is so influenced thereby as to decrease, resulting in under-exposure of a main subject. An automatic flash amount control apparatus of camera is proposed to prevent the under-exposure in U.S. Pat. No. 5,006,879, wherein flash control regions and contribution rates (weights) to be used upon flashing are determined according to metering outputs of stationary light metered by dividing a field to be photographed. According to such a camera, a high brightness region where the sun or the like exists may be excluded from the regions for controlling the flash amount, so that the under-exposure may be effectively prevented.

It is, however, general in flash photography that a region to be illuminated by flash, which is a region where a main subject exists, occupies only a portion of the screen. If there are many regions to be used in controlling the flash amount, a region where the main subject does not exist, which is a region with relatively low brightness because the high brightness region is the already cut, is included in the regions to be used in controlling flash amount. It is thus likely to result in over-exposure of a main subject in the above-mentioned conventional apparatus.

SUMMARY OF THE INVENTION

It is an object of the present invention to provide an automatic flash amount control apparatus of a camera capable of avoiding over-exposure of a subject even where the subject to be illuminated occupies only a small portion of the photographic screen.

The present invention may be applied to an automatic flash amount control apparatus of camera comprising: flashing means; first metering means for executing photo-metering of a field to be photographed while dividing the field into a plurality of first metering regions without flashing of the flashing means; second metering means for metering an optical flux emitted by the flashing means and then reflected by the field to be photographed while dividing the flux into a plurality of second metering regions; flash amount control region determining means for separating the second metering regions into two groups, one of which is to contribute to and the other of which is not to contribute to flash amount control, according to respective results of metering of the first metering regions; and flash amount controlling means for controlling, upon flashing of the flashing means an amount of flash of the flashing means according to results of metering of the second metering regions which have been determined to contribute to the flash amount control.

The automatic flash amount control apparatus is further provided with total number outputting means to output a total number of the second metering regions which have been determined to contribute to the flash amount control, and the flash amount controlling means controls the amount of flash of the flashing means upon the total number obtained.

The flash amount controlling means controls the amount of flash of the flashing means with inclusion of the total number of second metering regions which have been determined to contribute to the flash amount control. Accordingly, if the flash amount of flashing means decreases as the total number of regions to contribute to the flash amount control increases, the over-exposure of a main subject may be effectively avoided even where the subject to be illuminated by flashing, or main subject, occupies only a small portion of the screen and where there are many regions to be used for controlling flash amount.

BRIEF DESCRIPTION OF THE DRAWINGS

FIGS. 14A and 14B are flowcharts of a sub-routine to show details of processes for determining regions to be controlled in flash amount and for calculating a correction amount of flash;

FIG. 23 is a drawing to show short distance side and infinite distance side errors for a nominal distance for each focusing length;

FIG. 25 is a flowchart of a sub-routine to show details of a process for detecting a super high brightness region;

DESCRIPTION OF THE PREFERRED EMBODIMENTS

Figure 1:
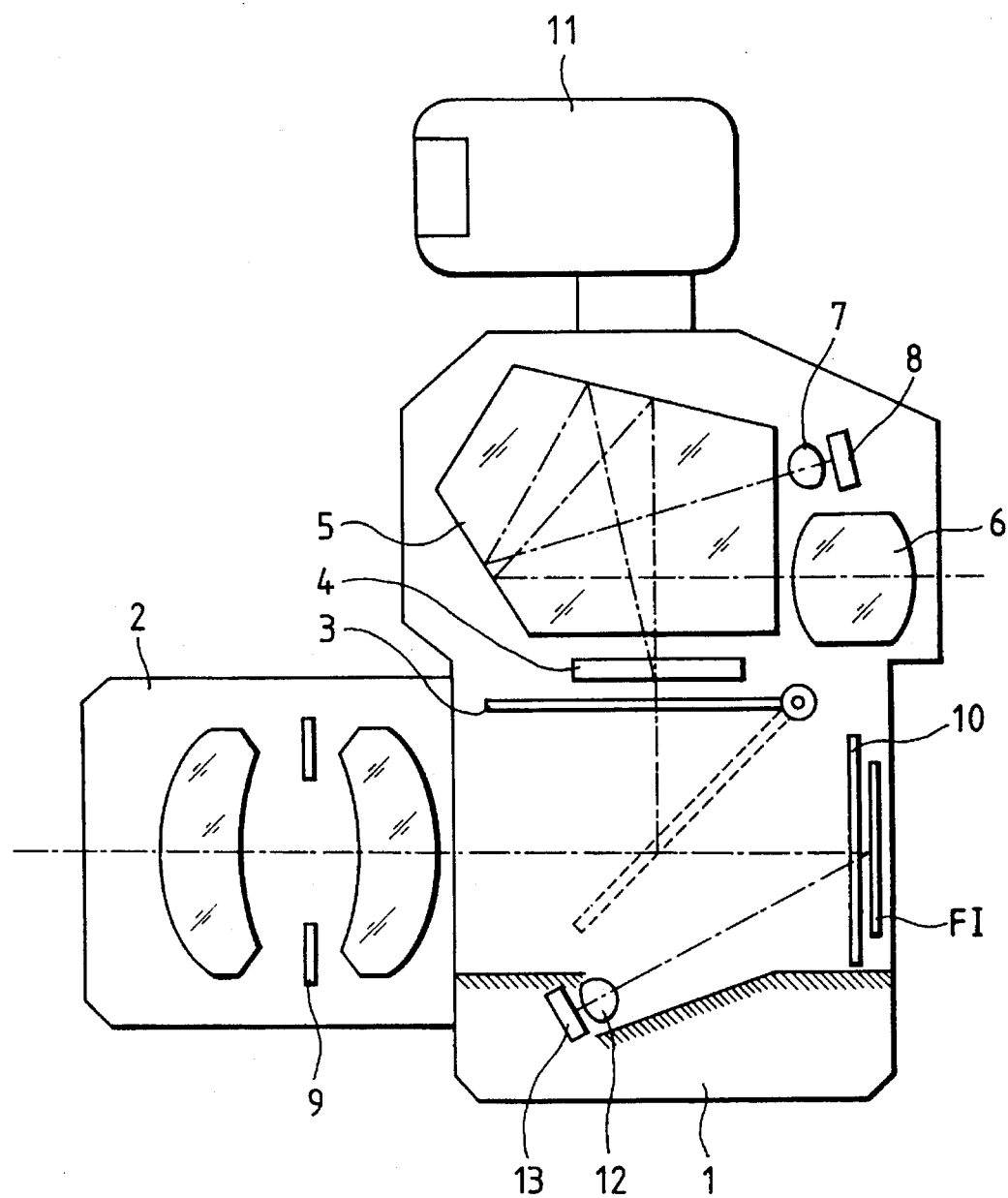
FIG. 1 is a drawing to show a structure of automatic flash amount control camera according to the present invention.
Figure 3:
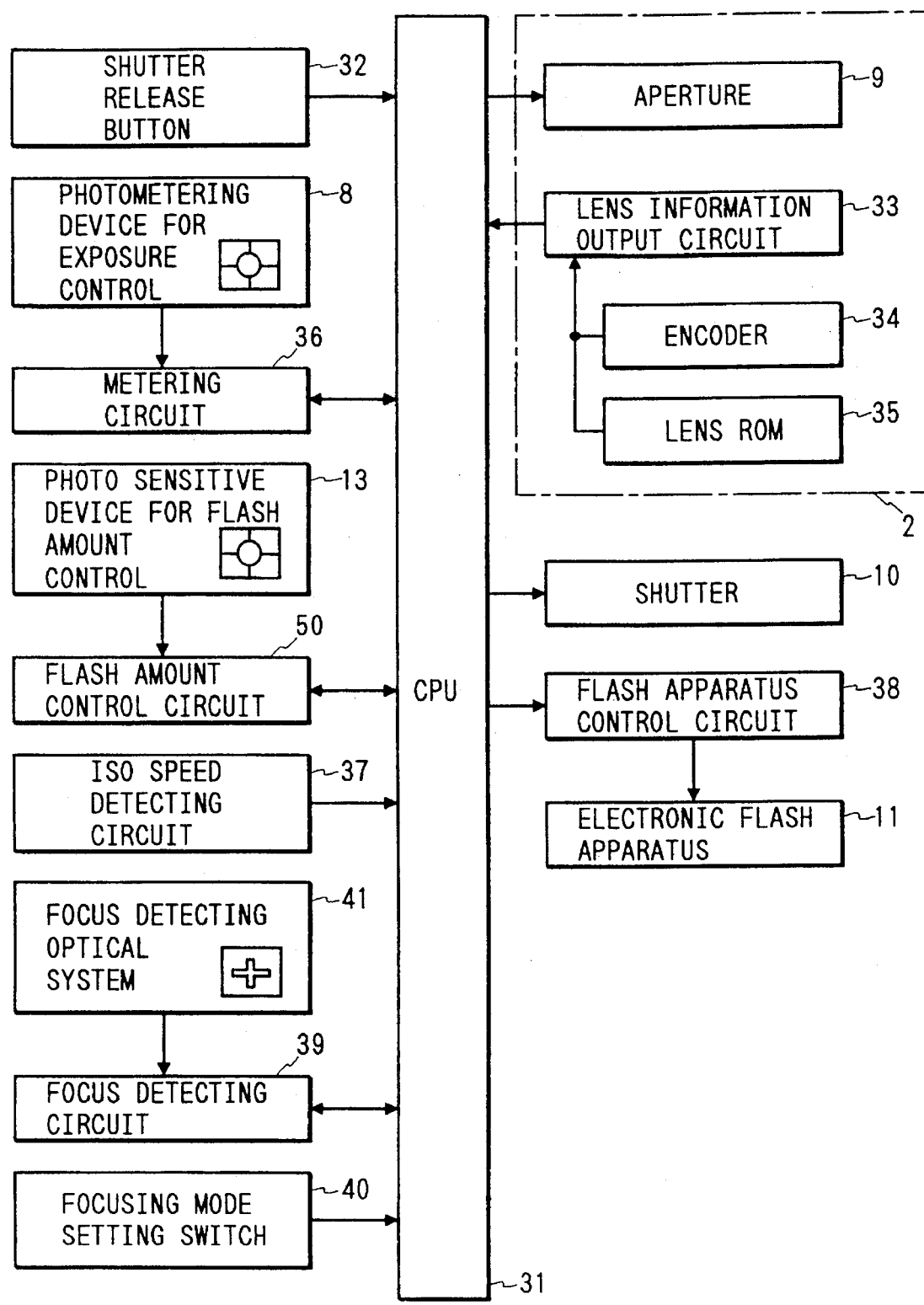
FIG. 3 is a block diagram to show a structure of automatic flash amount control apparatus of camera.

FIG. 1 is a drawing to show a structure of a TTL automatic flash amount control camera according to the present invention. In the illustrative camera, an optical flux or stationary light passed through the photographic lens 2 is reflected by a mirror 3 in a down position as shown by a broken line, then passes through a screen 4 and a pentaprism 5. A part of the light is guided to an eye piece 6, and the other part passes through a condenser lens 7 to be guided to a photo-metering element 8 for exposure calculation. Upon photographing, a release button 32 as shown in FIG. 3 is released to drive the mirror 3 to an up position shown by a solid line in FIG. 1, an aperture 9 is stopped down, and a shutter 10 is opened. Then the light of a subject passed through the photographic lens 2 is guided to a film FI for exposure.

Upon flash light photographing, an electronic flash apparatus 11 performs a main flash after the opening of shutter 10 to illuminate the subject, and a light reflected by the subject passes through the photographic lens 2 to reach a plane of the film. The optical flux reflected by the film is guided through a condenser lens array 12 to a photosensitive element 13 for flash amount control, and received thereby. Further, the camera of the present embodiment is capable of executing a preliminary flash to check conditions of a field to be photographed before the main flash. The light reflected from the photographic field upon the preliminary flash is reflected by a shutter curtain before opening of shutter 10, and received by the photosensitive element 13 for flash amount control.

Figure 2:
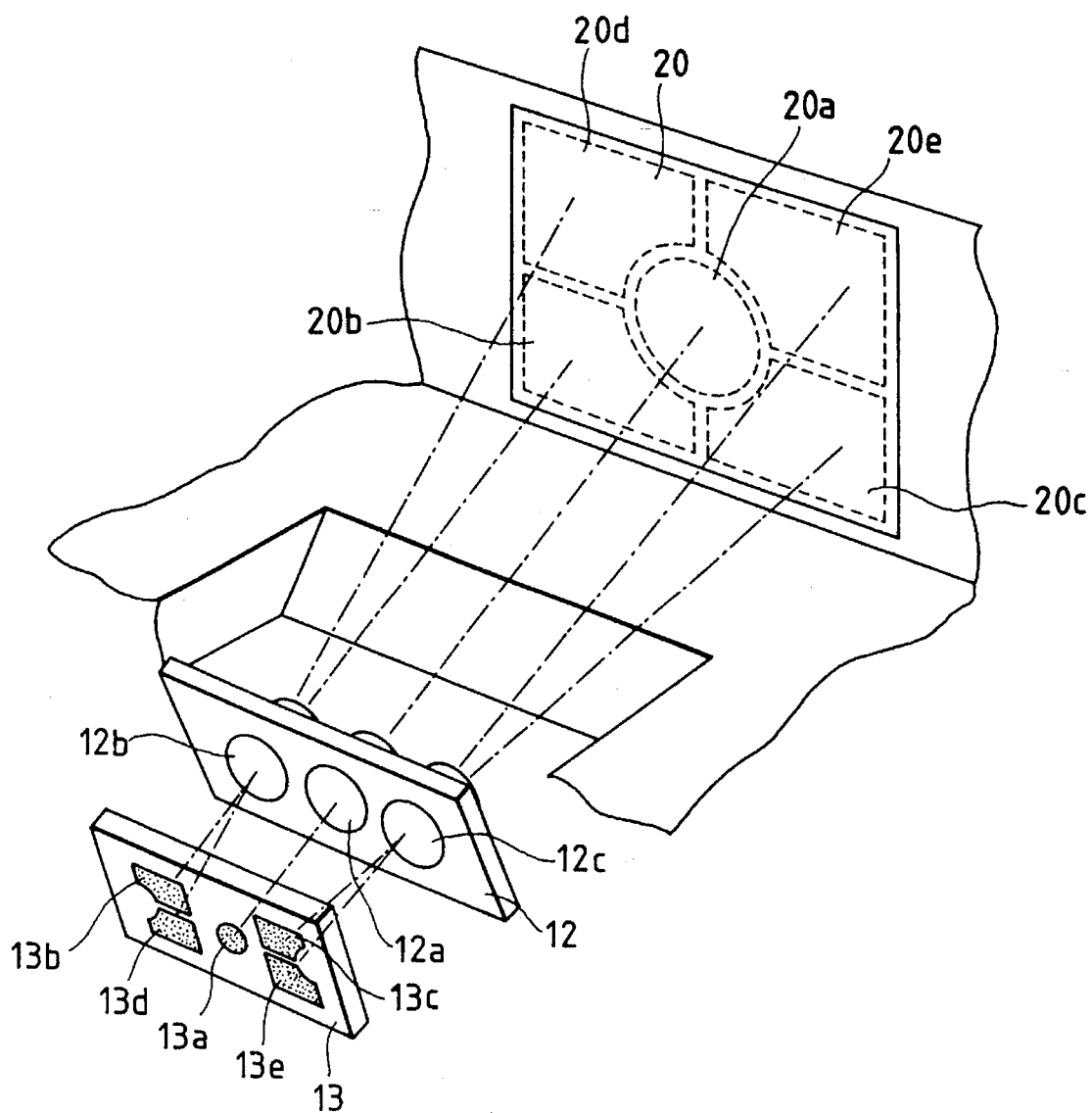
FIG. 2 is a perspective view to show a positional relation among a condenser lens array, a divided metering element, and a film.

The photosensitive element 13 for flash amount control is comprised of a photosensitive element segment 13a and photosensitive element segments 13b–13e on a common plane, as shown in FIG. 2. The photosensitive element segment 13a corresponds to a (spot) light metering region at the center of photographic field. The photosensitive element segments 13b–13e correspond to metering regions respectively having a shape of a rectangle lacking a corner sector, at a periphery of photographic field. Therefore, the photosensitive element 13 for flash amount control performs segmental photometry of five photometric regions of photographic field as divided, in the present embodiment. The condenser lens array 12 is an optical member having three lens portions 12a–12c corresponding to left, middle, and right blocks of photosensitive element segments 13a–13e.

If an exposure region 20 of one frame on the film plane is divided into five regions comprised of a central disk 20a and four peripheral regions 20b–20e similarly as the photographic field as shown in FIG. 2, the left, middle, and right blocks of photosensitive element segments 13a–13e oppose left, central, and right parts of film exposure region 20 via the three lens portions 12a–12c of condenser lens array 12, as respectively shown by broken lines in FIG. 2. Since the segmented photosensitive element 13 is approximately conjugate with the film exposure region 20, respective brightness values of five regions 20a–20e may be metered with the segments divided in almost identical shape.

FIG. 3 is a block diagram of a control system. Connected to a CPU 31 which controls a sequence of the entire camera are the shutter release button 32, the shutter 10, the aperture 9 in the photographic lens 2, and a lens information output circuit 33. The lens information output circuit 33 provides the CPU 31 with information such as a photo-taking distance or film-to-subject distance X detected by a conventional distance encoder 34 in the lens, an F value at a fully opened aperture FO, an exit pupil distance PO, a photo-taking distance error ΔX due to the resolution of the encoder 34 and other factors, which are stored in a lens ROM 35.

Also connected to the CPU 31 are a metering circuit 36 for conducting the photo-metering based on a metering signal from the exposure control metering element 8, a flash amount control circuit 50 for conducting the flash amount control based on outputs from the photosensitive element segments 13a–13e, or the photosensitive element 13 for flash amount control, an ISO speed detecting circuit 37 for reading out an ISO speed of mounted film FI from a DX code, and a flash device control circuit 38 of the electronic flash apparatus 11. The metering element 8 for exposure control is also comprised of five metering element segments 8a–8e corresponding to respective metering regions of photographic field, similarly to the photosensitive element 13 for flash amount control. A conventional focus detecting optical system 41 measures a distance near the central region of screen, and its output is converted into an amount of focus deviation by a focus detecting circuit 39 then to be input into the CPU 31. A focusing mode setting switch 40 is an operational member for selecting one mode from the following three modes: S-AF mode, or single AF mode, in which a lens position is locked once the photo-taking lens becomes in focus with a subject after start of focusing; C-AF mode, or continuous AF mode, in which focusing is continuously conducted as long as the release button is half-pressed; and M mode, or manual mode.

Figure 4:
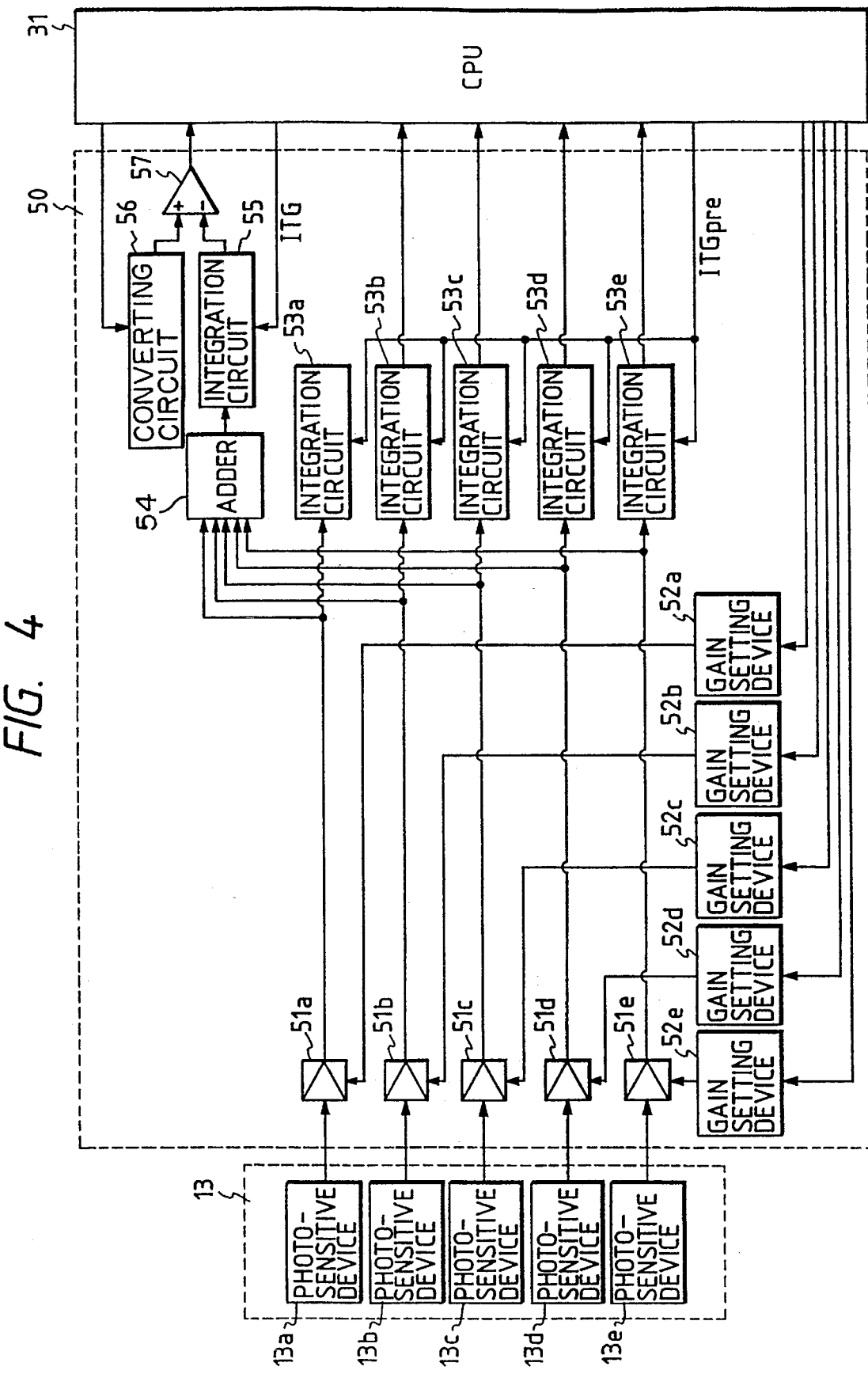
FIG. 4 is a drawing to show details of a flash amount control circuit.

FIG. 4 shows details of the above flash amount control circuit 50. The flash amount control circuit 50 has amplifiers 51a–51e to amplify the outputs of the photosensitive element segments 13a–13e, and gain setting devices 52a–52e to set amplifying rates of the amplifiers 51a–51e in response to a command from the CPU 31. The gain setting devices 52a–52e comprise D/A converters to convert digital signals out of the CPU 31 into analog signals.

The flash amount control circuit 50 further has integration circuits 53a–53e to respectively integrate the outputs of the amplifiers 51a–51e upon the preliminary flash with respect to time, an adder 54 to add the outputs of the amplifiers 51a–51e upon the main flash, an integration circuit 55 to integrate the addition result of the adder 54 with respect to time in response to a command from the CPU 31, a converting circuit 56 to convert into an analog signal a later-described flash amount control level preliminarily stored in the CPU 31, and a comparator 57 to compare the output of the integration circuit 55 with the converted flash amount control level to output a flash stop signal when the output of the integrating circuit 55 reaches the flash amount control level.

The flash photography control operation of the CPU 31 is explained in the following with reference to flowcharts of FIGS. 5 to 21.

Figure 5:
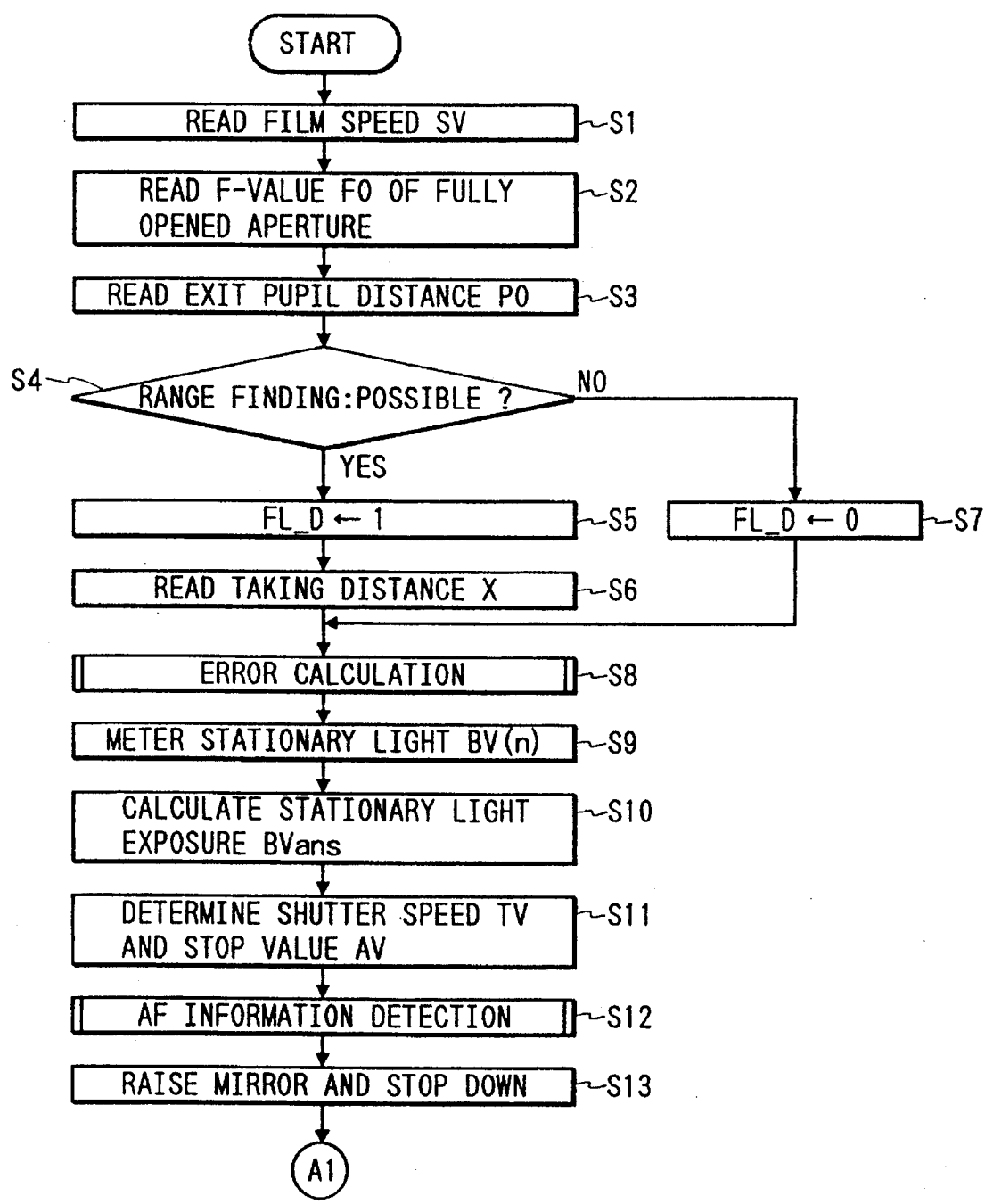
FIG. 5 is a flowchart of main program to illustrate processes of control of flash photography.
Figure 6:
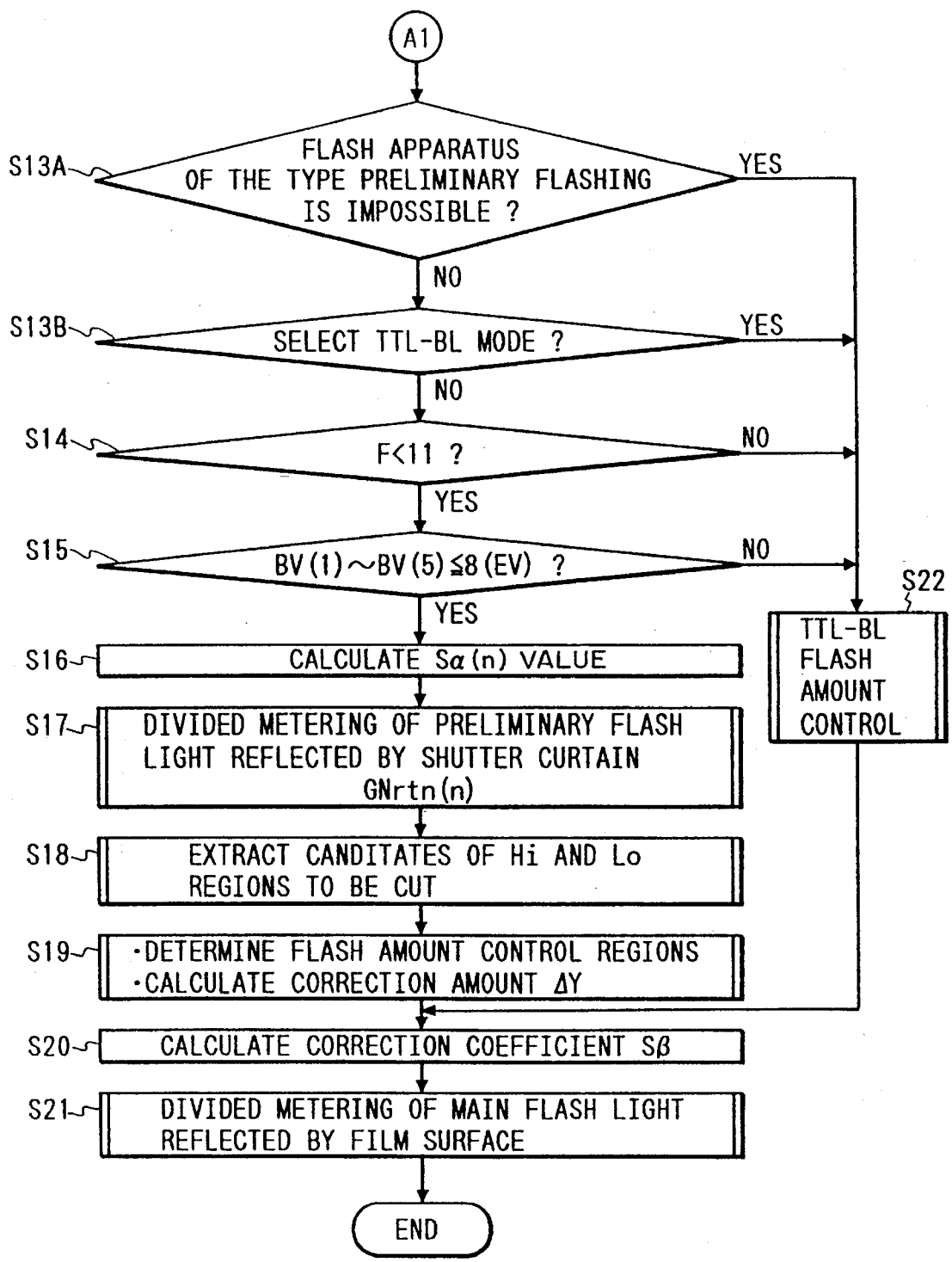
FIG. 6 is a flowchart to follow FIG. 5.

FIGS. 5 and 6 show a flowchart for main control program. Processes below Step 1 are executed when the shutter release button 32 of FIG. 4 is fully pressed or released following half-press. An ISO speed SV of mounted film FI is read out of the ISO detecting circuit 37 at Step S1. Also read out of the lens information output circuit 33 of the photographic lens 2 are an F value at a fully opened aperture FO at step S2 and an exit pupil distance PO at Step S3.

It is judged at Step S4 whether the photo-taking distance X is detectable. For example, if the photographic lens 2 has an internal encoder 34 for detecting a photo-taking distance as shown in FIG. 3, the distance X is detectable, and a flag FL_D is set to 1 at Step S5. In contrast, if the photographic lens 2 does not include an internal encoder 34, the distance X is not detectable, and a flag FL_D is set to 0 at Step S7. After Step S5, the photo-taking distance detected by the encoder 34 is read through the lens information output circuit 33 at Step S6, and then the flow goes to Step S8. After Step S7, the flow directly goes to Step S8.

At Step S8, calculation of errors is conducted to use for extracting candidates for Hi and low regions to be cut as described later. The errors are roughly classified into detection errors of the photo-taking distance and errors due to the preliminary flash of the flash device. The detection errors are further classified into two as follows:

(1) Errors caused by the lens barrel upon detection of photo-taking distance; and (2) Errors caused by focusing of body upon detection of photo-taking distance. Details of this process will be later explained with reference to FIGS. 7 and 8.

Stationary light is metered at Step S9. In detail, the metering circuit 36 receives the outputs of the above-described metering element segments 8a–8e in FIG. 3 to effect logarithmic compression thereon. After the logarithmic compression by the light metering circuit 36, brightness values BV(n), where n=1–5, for the respective metering regions are read. The value of n, i.e. 1–5, corresponds to each of the five metering element segments 8a–8e or the photosensitive element segments 13a–13e. A stationary light exposure BVans is calculated at Step S10 from the read brightness values BV(n) and ISO speed SV. The calculation may be carried out by using a method as disclosed in FIG. 6 of U.S. Pat. No. 4,965,620 owned by the same assignee as the present application.

A shutter speed TV and a stop value AV are determined at Step S11 by a known process from the thus-calculated stationary light exposure BVans, to proceed to the next Step S12.

Information about focusing is detected at Step S12. Specifically, the information is about the focusing mode and about a state of focusing. The focusing mode is the continuous AF mode, the single AF mode, or the manual focusing mode as above described. The state of focusing is a value of focus deviation. Details thereof will be later explained with reference to FIG. 9. Then at Step S13, the mirror 3 is raised from the state of the broken line to the state of the solid line in FIG. 1, and the aperture 9 is stopped down to the stop value AV determined at Step S11. The flow proceeds then to proceed to Step S13A of FIG. 6.

At Steps S13A–S15, it is judged whether the process of preliminary flash should be conducted. It is judged at Step S13A whether the electronic flash device 11 is capable of executing the preliminary flash. If the preliminary flash is possible, the flow goes to Step S13B, or if impossible, to Step S22. This judgment is carried out by communication between the camera body and the electronic flash device 11. If it is judged at Step S13B that the TTL-BL mode is selected (through an unrepresented external selection switch), the flow goes to Step S22, or otherwise the flow goes to Step S14.

If it is judged at Step S14 that the stop value AV determined at above Step S11 is not less than a predetermined value, for example the F value of not less than 11 in the present embodiment, which is darker stop, the flow proceeds to Step S22 without the preliminary flash because it is probable that the preliminary flash of small flash amount cannot be detected. If it is judged at Step S15 that the stationary light is sufficiently bright, or if all the brightness values BV(1)–(5) exceed 8 EV, the flow also proceeds to Step S22 without the preliminary flash because it could be obscured by the stationary light. Otherwise, the flow proceeds to Step S16. The Step S22 is to conduct a process for TTL-BL flash amount control without the preliminary flash, and then to conclude the process. Details of the TTL-BL flash amount control will be later described with reference to FIGS. 25–28.

At Step S16, a correction coefficient $S\alpha(n)$ is calculated for each metering region of the photo-taking lens for the metering of shutter curtain reflection from the following equations.

$$S\alpha(1)=1$$

$$S\alpha(2)=1-(1.2\times10^{-3})\cdot PO$$

$$S\alpha(3)=1-(1.2\times10^{-3})\cdot PO$$

$$S\alpha(4)=1+(1.7\times10^{-3})\cdot PO$$

$$S\alpha(5)=1+(1.7\times10^{-3})\cdot PO$$

In the equations, PO represents an exit pupil distance of the photo-taking lens 2. Since conditions of light reception of the above-mentioned photosensitive element segments 13a–13e change depending on the exit pupil distance PO of the photo-taking lens 2, the above lens correction coefficients $S\alpha(n)$ are obtained to evaluate all the metering signals of the photosensitive element segments in the same condition at the process of Step S16.

The preliminary flash is carried out at Step S17 to perform the segmental photometry of reflection light from the shutter curtain surface. A candidate of region to be cut, as will be referred to as a provisional cut region, is extracted at Step S18 based on the metering results. The provisional cut region is not to contribute to the flash amount control. Metering regions to contribute to the flash amount control upon the main flash, or effective regions, and the control correction amount $\Delta Y$ are determined at Step S19, based on the results of process at Step S18. The processes of these Steps S17–S19 will be later detailed with reference to FIGS. 11–20. A lens correction coefficient $S\beta(n)$ is calculated at Step S20 for each of the respective metering regions of photo-taking lens 2 upon the metering of reflection light from the film plane. It is assumed in this embodiment that $S\beta(n)=S\alpha(n)$. At Step S21, the shutter 10 is fully open to execute the main flash, and the flash amount control is performed by segmental photometry of reflection light from the film plane. This process will be later described with reference to FIGS. 20 and 21.

Figure 7:
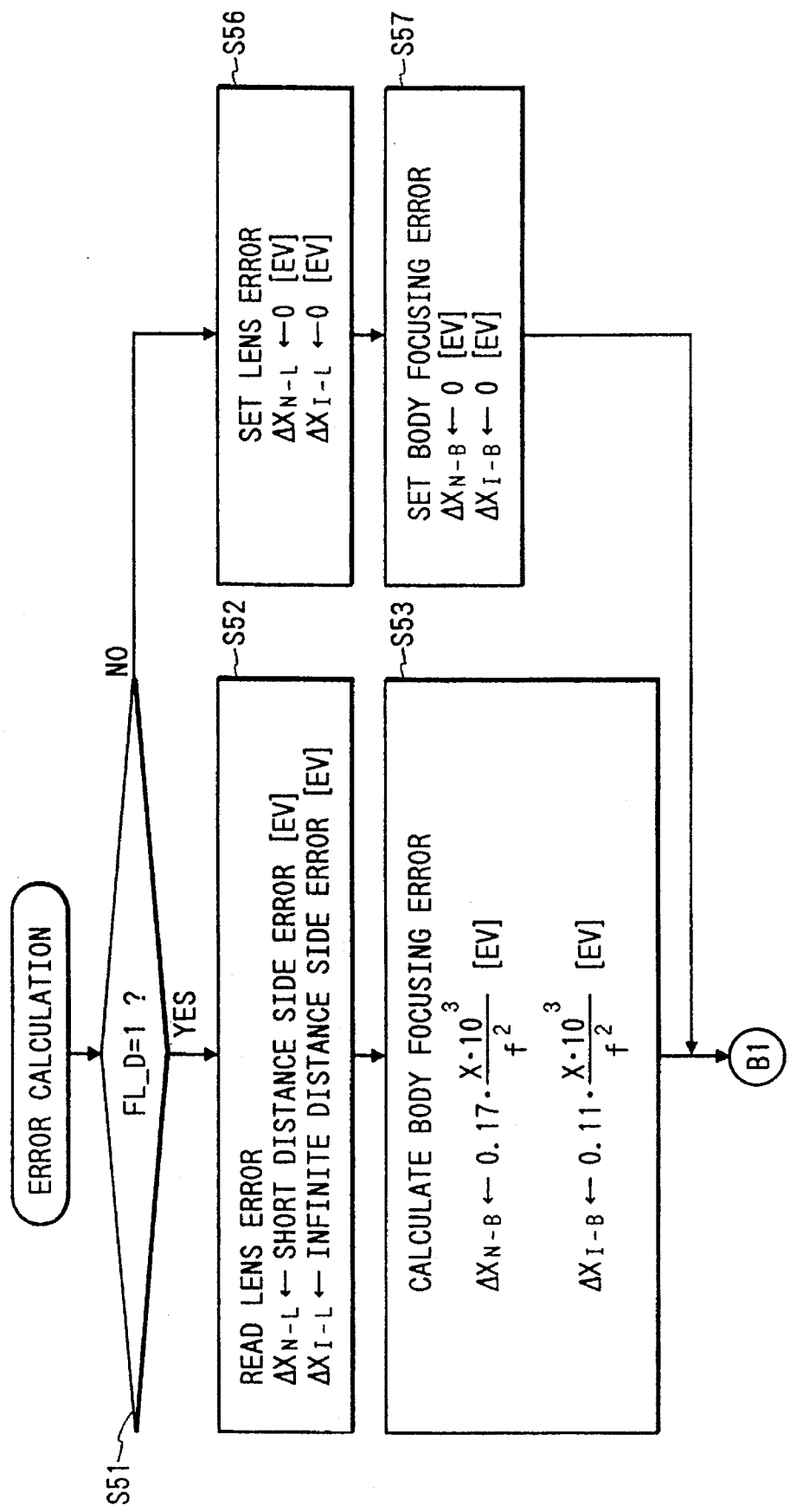
FIG. 7 is a flowchart of a sub-routine to show details of error calculation.
Figure 8:
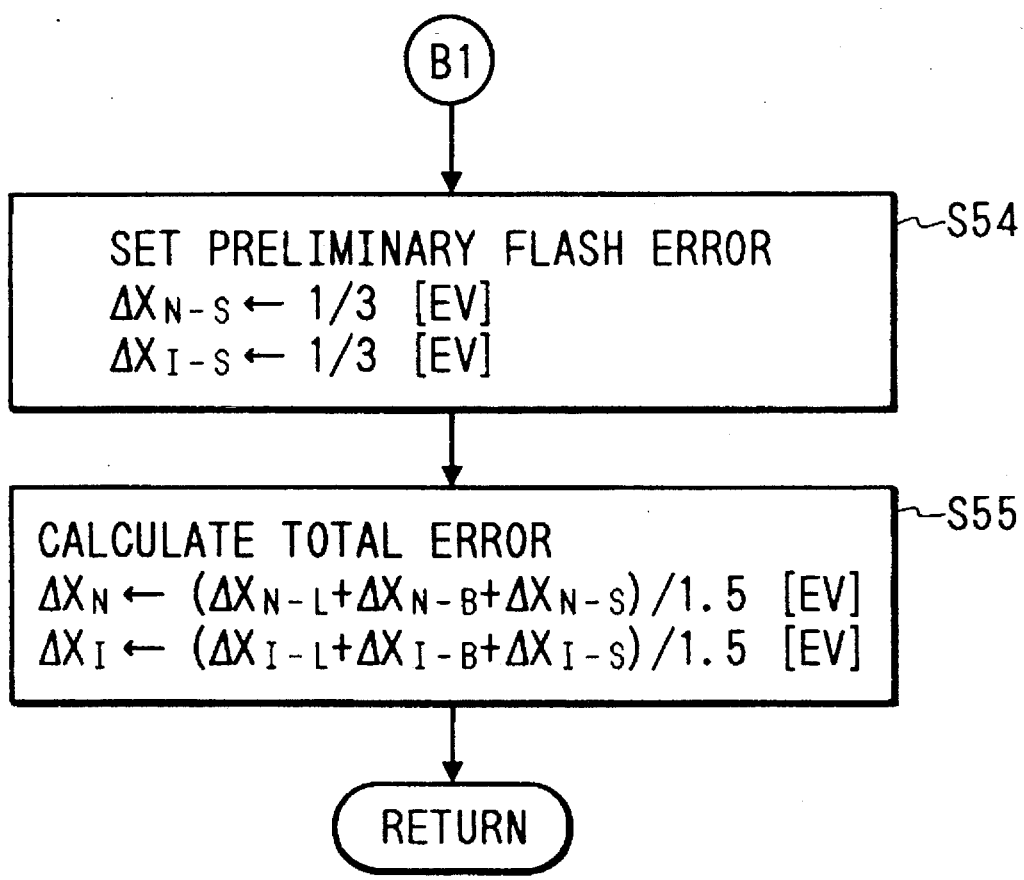
FIG. 8 is a flowchart to follow FIG. 7.

FIGS. 7 and 8 are flowcharts to show the process of Step S8 or details of error calculation in FIG. 5.

When it is judged at Step S51 that the flag FL_D=1, or when the photo-taking distance is detectable with a distance encoder built in the photo-taking lens 2, the flow goes to Step S52. Read through the lens information output circuit 33 at Step S52 is a distance detection error $\Delta X$ related to the photo-taking lens, which is stored in the lens ROM 35 of the photo-taking lens 2. The distance detection error $\Delta X$ is comprised of a short distance side error $\Delta X_{N-L}$ and an infinite distance side error $\Delta X_{I-L}$ for a nominal photo-taking distance X, which are preliminarily stored in the ROM 35. Their unit is [EV]. FIG. 23 is a drawing to show a relation among the photo-taking distance X, the focusing length f, and the distance detection error $\Delta X$. In FIG. 23, the distance detection error increases as the photo-taking distance X increases or as the angle of view becomes wider. FIG. 23 shows a part of error data kept in the photo-taking lens 2, which is a table of the short distance side error $\Delta X_{N-L}$ and the infinite distance side error $\Delta X_{I-L}$ for the nominal photo-taking distance X of sixteen encoder positions and the focusing length. In FIG. 23, 9.9, which is a value deemed as infinity, is set for the short distance side error in the shortest photo-taking distance or in encoder position 16, and for the infinite distance side error in the farthest photo-taking distance or in encoder position 1. The reason therefor will be later explained.

Next at Step S53, the distance detection error related to focusing of camera body is calculated. A calculation equation is approximated as follows for simplicity of calculation.

$$\Delta X_{N-B} = 0.17 \cdot (X \cdot 10^3)/(f^2)$$

for the short distance side error $\Delta X_{N-B}$.

$$\Delta X_{I-B} = 0.11 \cdot (X \cdot 10^3)/(f^2)$$

for the infinite distance side error $\Delta X_{I-B}$. In the equations, a unit of focusing length f is [mm], a unit of photo-taking distance X [mm], and a unit of the errors $\Delta X$ [EV]. As seen from the equations, the distance detection error related to the focusing of camera body is proportional to the photo-taking distance and is in inverse proportion to the square of focusing length.

Next at Step S54 of FIG. 8, errors related to the preliminary flash of the flash apparatus 11 are set. Setting values are $\Delta X_{N-S} = \frac{1}{3}$ for the short distance side error $\Delta X_{N-S}$, and $\Delta X_{I-S} = \frac{1}{3}$ for the infinite distance side error $\Delta X_{I-S}$. Thus the setting values are constant. A unit of error $\Delta X$ is [EV].

At Step S55, the total of the above errors is calculated. That is, $$\Delta X_N = (\Delta X_{N-L} + \Delta X_{N-B} + \Delta X_{N-S})/1.5$$

for a short distance side total error $\Delta X_N$, and $$\Delta X_I = (\Delta X_{I-L} + \Delta X_{I-B} + \Delta X_{I-S})/1.5$$

for the infinite distance side total error $\Delta X_I$. A unit of the total errors $\Delta X$ is [EV].

Then the flow returns to the process of FIG. 5.

When it is judged at Step S51 that the flag FL_D is not 1, or when the distance is not detectable with a distance encoder built in the photo-taking lens 2, the flow proceeds to Step S56.

At Step S56, a distance detection error $\Delta X$ related to the photo-taking lens is set. That is, $\Delta X_{N-L} = 0$ for the short distance side error $\Delta X_{N-L}$, and $\Delta X_{I-L} = 0$ for the infinite distance side error $\Delta X_{I-L}$.

At Step S57, a distance detection error $\Delta X$ related to focusing of camera body is set. That is, $\Delta X_{N-B} = 0$ for the short distance side error $\Delta X_{N-B}$, and $\Delta X_{I-B} = 0$ for the infinite distance side error $\Delta X_{I-B}$. The flow goes to Step S54 thereafter.

Figure 9:
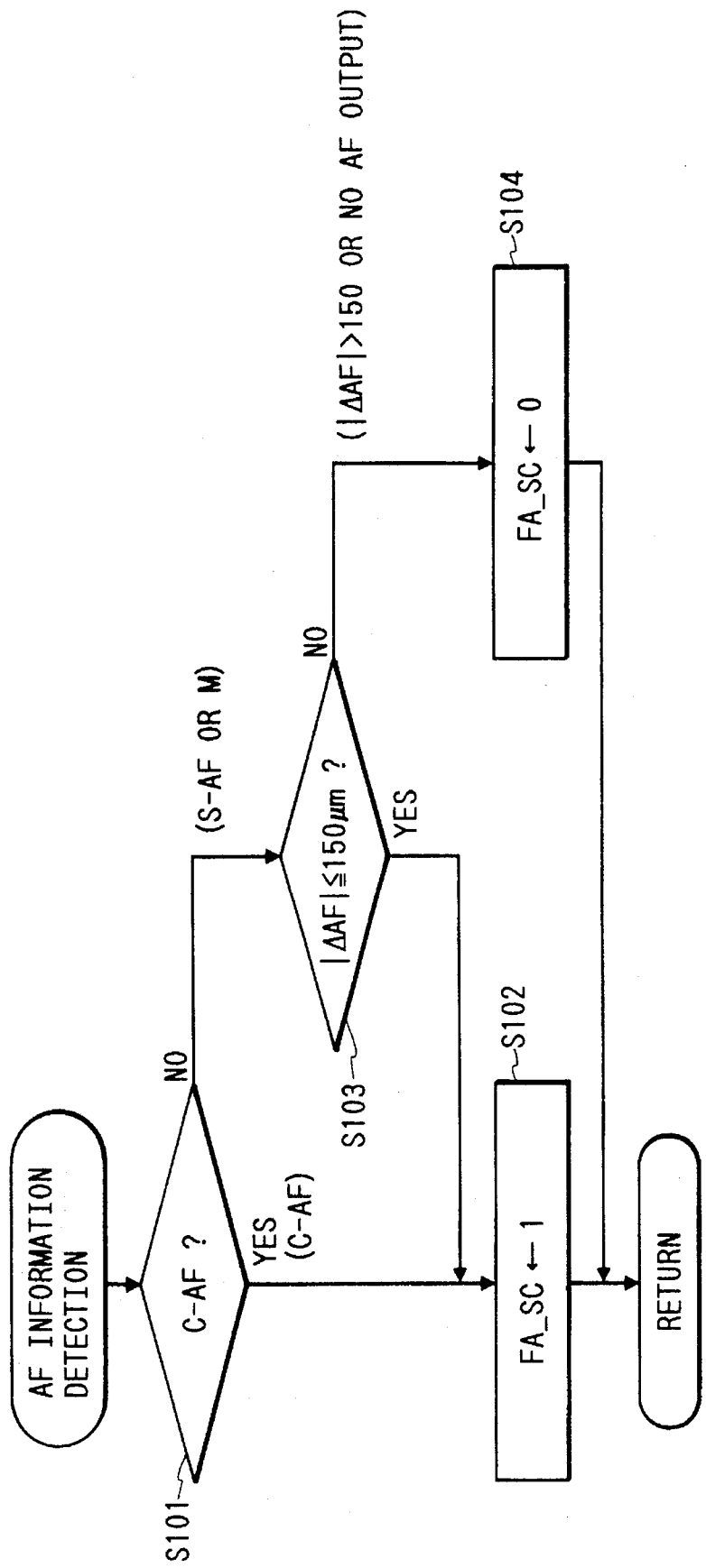
FIG. 9 is a flowchart of a sub-routine to show details of AF information detecting process.

FIG. 9 is a flowchart to show an AF information detection process at Step S12 of FIG. 5.

The judgment of focusing mode is conducted at Step S101. If the focusing mode is set in the C-AF mode, it is judged that a main subject is within the focus detection zone (central portion) of photographic screen and a flag FA_SC is set to 1 at Step S102. If the S-AF mode or the M mode is set, Step S103 is performed because it cannot be judged whether a main subject is within the focus detection zone of the screen. It is judged at Step S103 whether an absolute value $|\Delta AF|$ of focus deviation $\Delta AF$ immediately before photographing is not more than 150 μm. If the absolute value $|\Delta AF|$ is not more than 150 μm, Step S102 is performed under an assumption that the main subject is within the focus detection zone of photographic screen to set the flag FA_SC to 1. While, if the absolute value $|\Delta AF|$ is more than 150 μm, Step S104 is performed under an assumption that no main subject is present in the focus detection zone of screen or as an undistinguishable case to set the flag FA_SC to 0. Then the routine returns to the process of FIG. 5.

Figure 10:
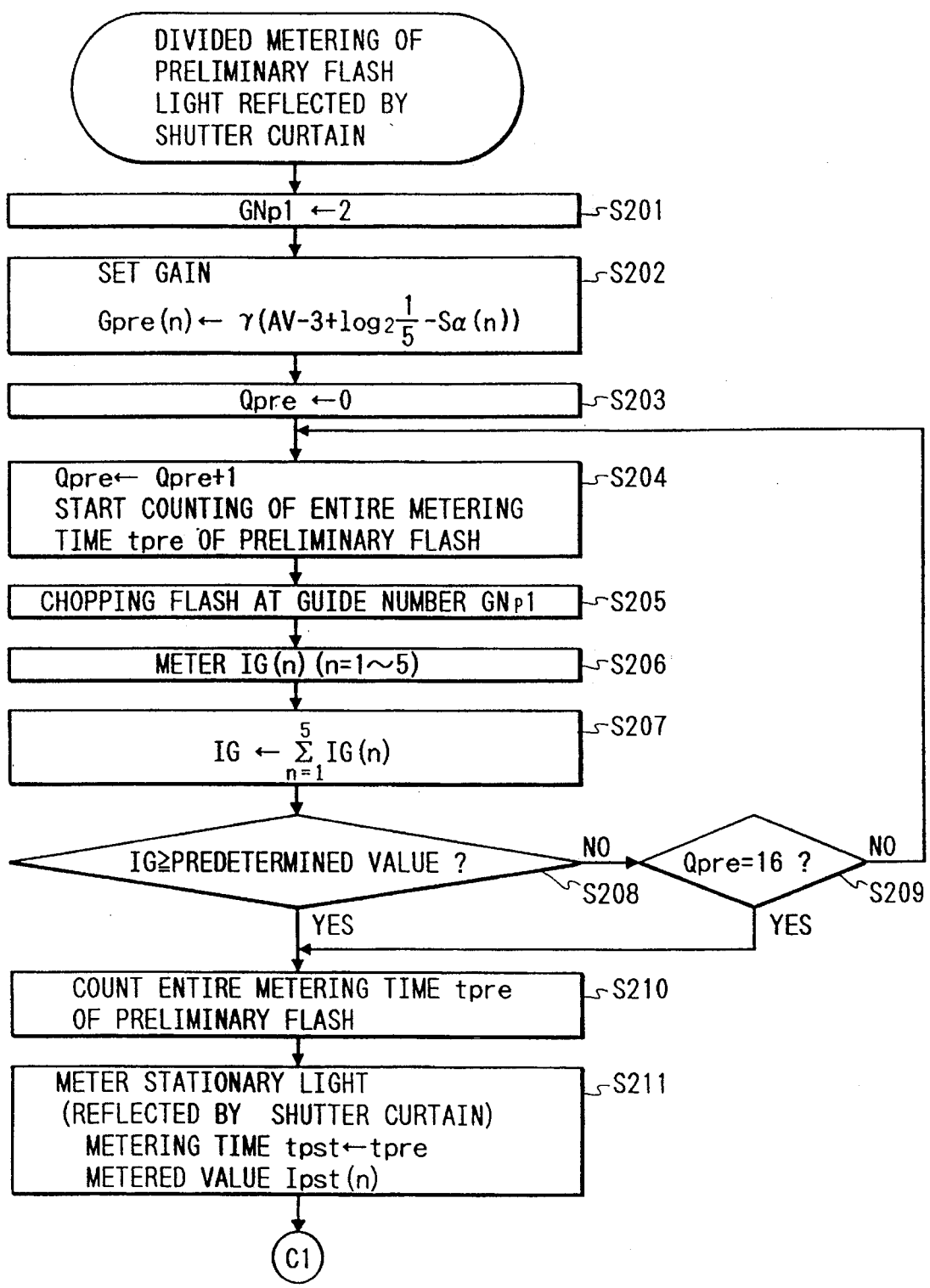
FIG. 10 is a flowchart of a sub-routine to show details of photo-metering process upon a preliminary flash.
Figure 11:
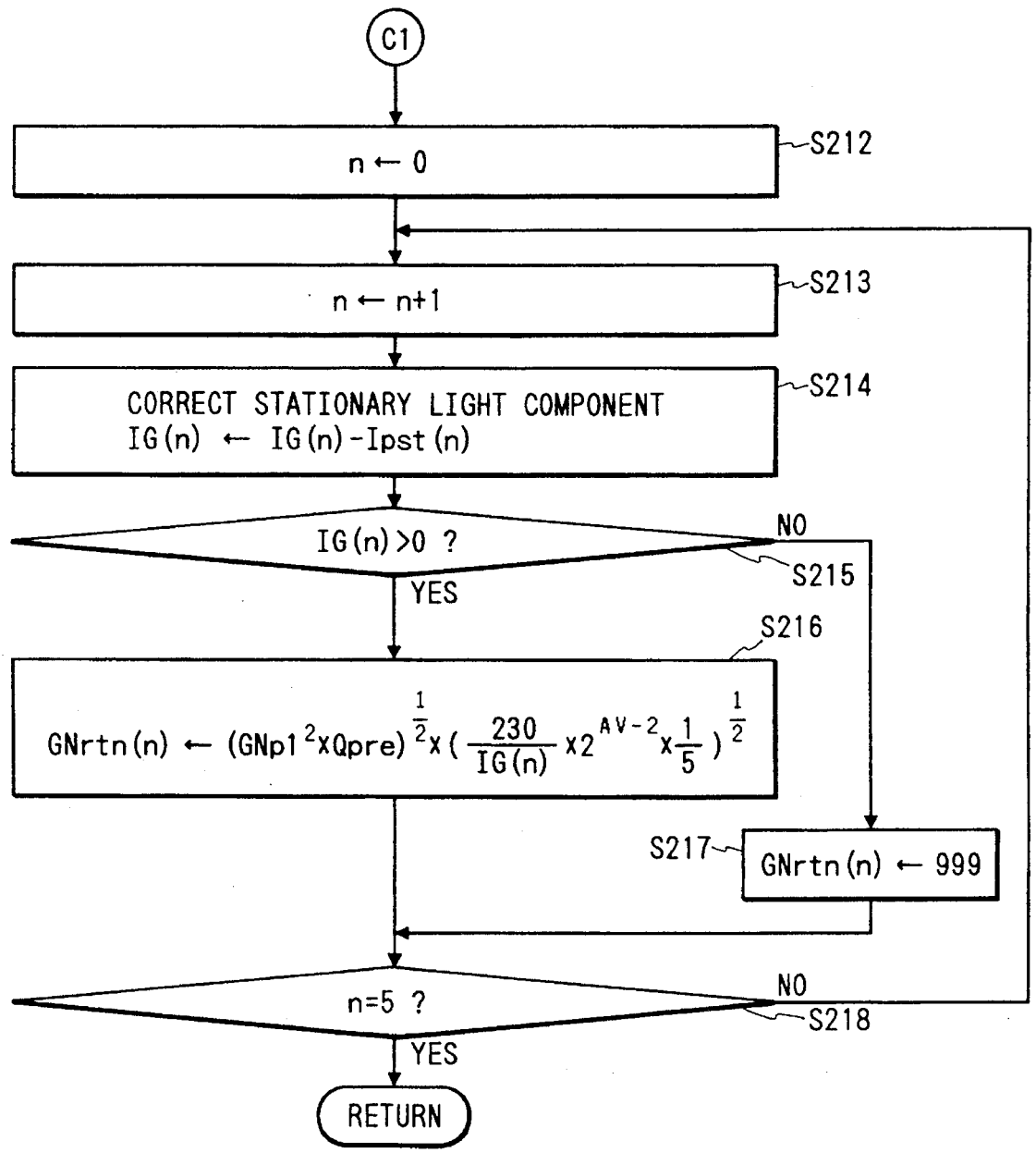
FIG. 11 is a flowchart to follow FIG. 10.

FIGS. 10 and 11 are flowcharts to show the preliminary flash process at Step S17 of FIG. 6.

A guide number GNp1 per preliminary flash is set to 2 at Step S201. There are a plurality of chopping flashes of guide number of 2 upon the preliminary flash in this embodiment. At Step S202, gains Gpre(n) are calculated by the following equation for the gain setting devices 52a–52e of flash amount control circuit 50 in FIG. 4, using the lens correction coefficient $S\alpha(n)$ obtained at above Step S15.

$$Gpre(n) = \gamma(AV - 3 + \log_2(\frac{1}{5}) - S\alpha(n))$$

The number Qpre of chopping flashes is reset to zero at Step S203. At Step S204, the number Qpre gains an increment of 1, and a timer is started to measure a metering time upon the preliminary flash then to proceed to Step S205. A chopping flash is performed at Step S205 per guide number GNp1 (GNp1=2). The metering of the chopping flash is carried out at Step S206. In detail, an optical flux of chopping flash is reflected in the photographic field to pass through the photographic lens 2, focusing into a primary image on the blind surface of shutter 10. The primary image is divided into five regions, which are respectively received by the five photosensitive element segments 13a–13e via the condenser lens array 12 as shown in FIG. 2. The photosensitive element segments 13a–13e output respective metering signals corresponding to respective reception amounts to the amplifiers 51a–51e of flash amount control circuit 50.

The amplifiers 51a–51e amplify the respective light metering signals with the gains Gpre(n) set in the gain setting devices 52a–52e after calculation at Step S202, and output the amplified signals to the integration circuits 53a–53e. The CPU 31 outputs operational signals to the integration circuits 53a–53e, and then the integration circuits 53a–53e integrate with respect to time the respective amplified signals in response to the operational signals to output integration values IG(n), where n=1–5.

A summation of integration values IG(n) of five metering signals is calculated at Step S207. It is judged at Step S208 whether the summation IG of metering signals is less than a predetermined value, for example, 230 in this embodiment. If the summation is less than the predetermined value, Step S209 is carried out. It is judged at Step S209 whether the number Qpre of chopping flashes is less than 16. If the value IG reaches 230, or if the number Qpre is 16, Step S210 is performed. At Step S210, the time measured from the start at Step S204 is determined as a total metering time tpre required for photometry upon the preliminary flash, and then the flow proceeds to Step S211.

At Step S211, the metering of stationary light is carried out by the same optical system as in metering of preliminary flash. The metering time tpst is set to be equal to the total metering time tpre required for the metering of preliminary flash. The thus-obtained metered value of stationary light is referred to as Ipst(n).

At next Steps S212–218, a correction of the stationary light component is effected for the five outputs of n=1–5, and the guide number GNrtn is calculated. The region number n is first reset to zero at Step S212, and the region number n is given an increment of 1 at Step S213. At Step S214, a correction is effected by subtracting the stationary light component Ipst(n) from the integration value IG(n) including the preliminary flash component and the stationary light component to set the result value of subtraction as a new IG(n). If it is then judged at Step S215 that the corrected integration value IG(n) is positive, Step S216 is performed to obtain GNrtn(n) as follows:

$$GNrtn(n) = (GNP1^2 \times Qpre)^{1/2} \times [\{230/IG(n)\} \times 2^{AV-2} \times (1/8)]^{1/2}$$

According to this equation, GNrtn(n) becomes a value obtained by multiplying the stop value F by the photo-taking distance X if a subject in each region has a standard reflectance. In other words, there is a subject of standard reflectance at a position of photo-taking distance X in a region of F·X=GNrtn(n), there exists an object of higher reflectance at a position of photo-taking distance X in a region of F·X>GNrtn(n) than the standard reflectance, and there exists an object of lower reflectance at a position of photo-taking distance X in a region of F·X<GNrtn(n) than the standard reflectance. The higher the reflectance of object, the smaller GNrtn(n).

If the integration value IG(n) is judged at Step S215 not to be positive, a very large value, for example 999, regarded as infinity is set as GNrtn(n) at Step S217, with the flow then to proceed to Step S218. It is judged at Step S218 whether n=5. If n=5, the flow returns to the process of FIG. 6, and otherwise to Step S213 to repeat the above processes.

Figure 12:
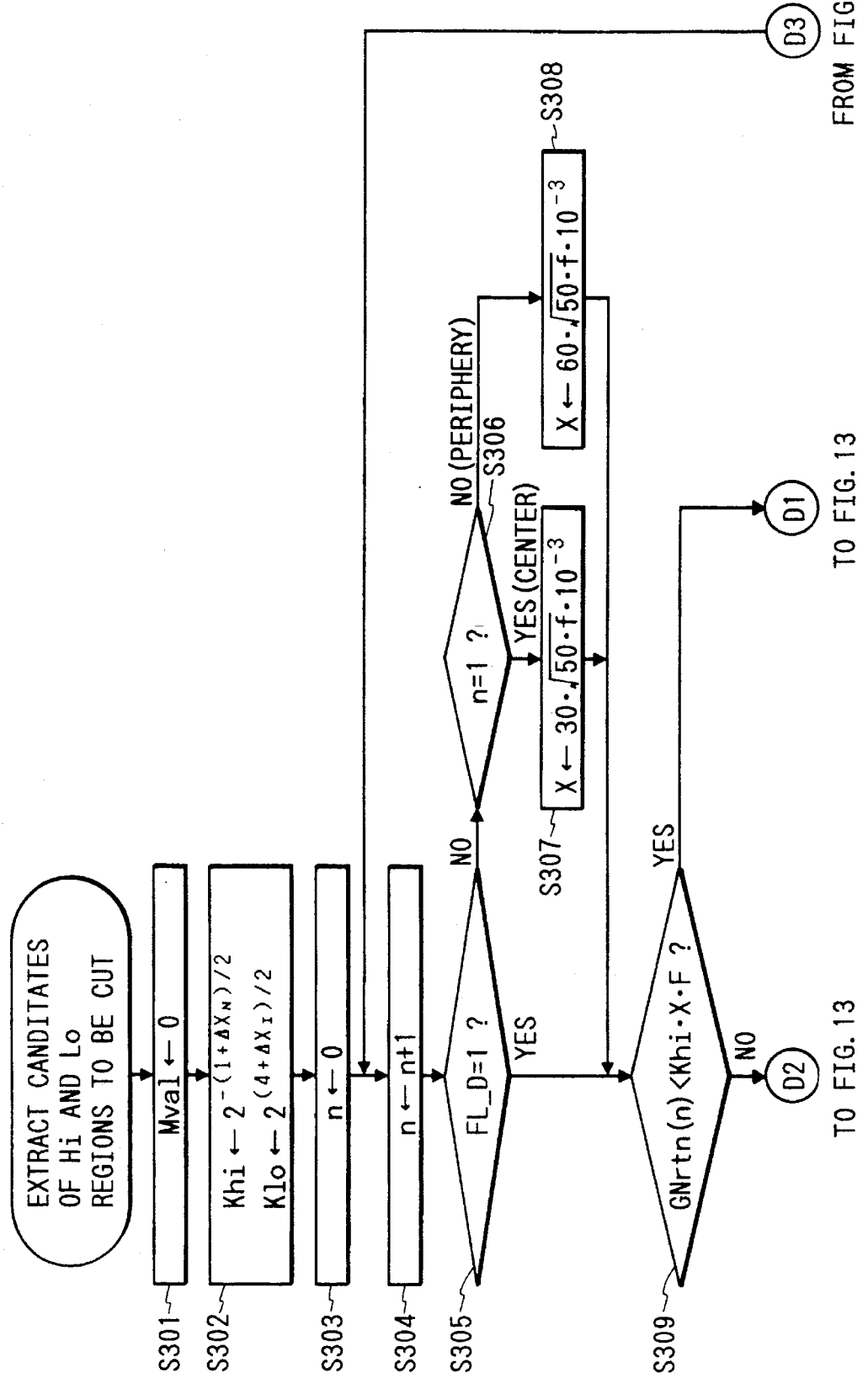
FIG. 12 is a flowchart of a sub-routine to show details of a process for extracting candidates of regions to be cut.
Figure 13:
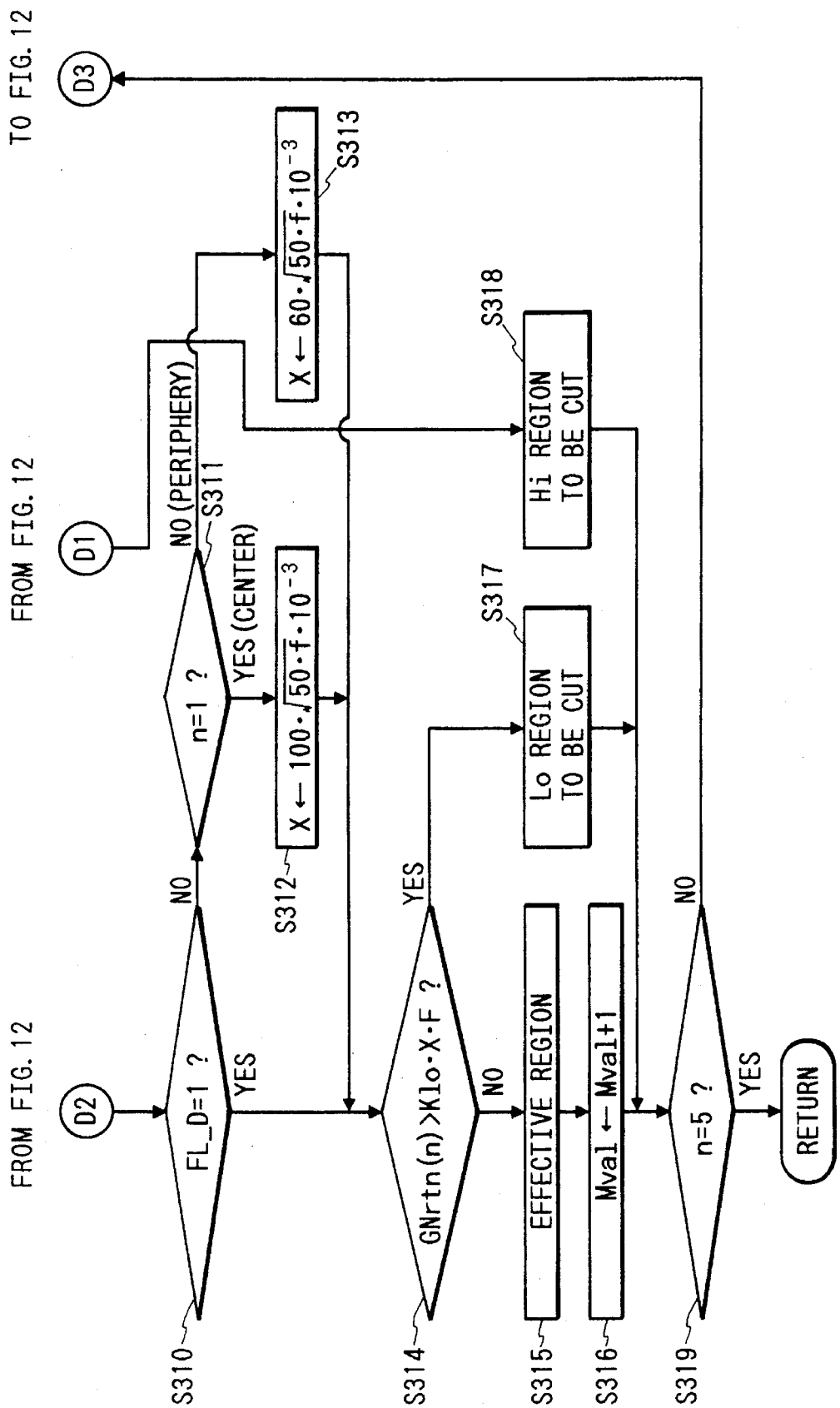
FIG. 13 is a flowchart to follow FIG. 12.

FIGS. 12 and 13 show details of processes of Step S18 in FIG. 6 for extracting candidates of Hi and Lo regions to be cut.

The effective region number Mval is reset to zero at Step S301. At Step S302, coefficients Khi and Klo used for Hi cut and Lo cut as later described are obtained as follows using the total errors obtained at the above Step S55.

$$Khi=2^{DH}(\text{where } DH=-(1+\Delta X_N)/2), \text{ and } Klo=2^{DL}(\text{where } DL=+(4+\Delta X_I)/2)$$

The coefficient Khi for Hi cut is calculated using the short distance side total error $\Delta X_N$, and the coefficient Klo for Lo cut using the infinite distance side total error $\Delta X_I$. According to the above equations, the coefficient Khi becomes smaller as the error $\Delta X_N$ increases, and the coefficient Klo becomes larger as the error $\Delta X_I$ increases. That is, as the error becomes greater, the coefficients Khi and Klo for cut are determined such that an outstanding region is unlikely to become a candidate of Hi cut or Lo cut, or that it is likely to become an effective region, so that such an inconvenience may be avoided that a region including the main subject is cut where the detection errors of photo-taking distance and the like are great. For example, when the total errors $\Delta X_N$, $\Delta X_I$ both are 0, Khi=0.71 and Klo=4. If the total errors $\Delta X_N$, $\Delta X_I$ both are 1 [EV], Khi=0.5 and Klo=5.66.

The area number n is reset to zero at Step S303, and then the area number n is given an increment of 1 at Step S304. It is judged at Step S305 whether the flag FL_D is 1. That the flag FL_D is not 1 means that the photo-taking distance X is not detected. If the result of Step S305 is affirmative, or if the photo-taking distance X is detected, Step S309 is performed. If the result is negative, Step S306 is performed. If it is judged at Step S306 that n=1, that is, in calculation for the central region, the photo-taking distance X is set as follows at Step S307, and then the flow proceeds to Step S309.

$$X=30 \cdot (50 \cdot f)^{1/2} \cdot 10^{-3}$$

If n is not 1, or in calculation for peripheral region, Step S308 is processed to set the photo-taking distance as follows, and then the flow proceeds to Step S309.

$$X=60 \cdot (50 \cdot f)^{1/2} \cdot 10^{-3}$$

It is judged at Step S309 whether the guide number GNrtn(n) calculated at above Step S216 in FIG. 11 is smaller than Khi·X·F. If smaller, the flow goes to Step S318 of FIG. 13, while if not, to Step S310. At Step S318, the region is regarded as a provisional Hi cut region where there exists an object of high reflectance such as golden screen or mirror, or where there exists a subject, which is not a main subject, on the shorter distance side than the photo-taking distance X. Then the flow goes to Step S319.

Even if the photo-taking distance X is not detected, the judgment of Step S309 is conducted using the photo-taking distance X set at Step S307 or Step S308 to regard the region as a provisional Hi cut region if the guide number GNrtn is clearly extremely small, judging a high reflection object. Comparing the photo-taking distance X of Step S307 with that of Step S308, the photo-taking distance X of Step S307 is set to be smaller than that of Step S308. This is because it is made more difficult to judge the center as the provisional Hi cut region than the periphery to prevent the main subject from being cut at the center, since it is highly probable that the main subject is located at the center.

It is again judged at Step S310 of FIG. 13 whether the flag FL_D is 1. If the result is affirmative, Step S314 is performed, while if negative, Step S311 is performed. It is judged at Step S311 whether the region number n is 1. If n=1, or if the region is the center, a value determined by the following equation is set as the photo-taking distance X at Step S312.

$$X=100 \cdot (50 \cdot f)^{1/2} \cdot 10^{-3}$$

Then the flow goes to Step S314.

If n is not 1, or if the region is a peripheral region, a value determined by the following equation is set as the photo-taking distance X at Step S313.

$$X=60 \cdot (50 \cdot f)^{1/2} \cdot 10^{-3}$$

Then the flow goes to Step S314.

It is judged at Step S314 whether the guide number GNrtn(n) is larger than Klo·X·F. If larger, Step S317 is performed, while if not, Step S315 is performed. The region is judged at Step S317 as a provisional Lo cut region under a judgment that there exists a low reflectance object in the region, for example, in case of missing background. Then the flow goes to Step S319.

Even if the photo-taking distance X is not detected, the judgment of Step S314 is conducted using the photo-taking distance X set at Step S312 or Step S313 to regard the region as a provisional Lo cut region if the guide number GNrtn is clearly extremely large, judging a low reflectance object. Comparing the photo-taking distance X of Step S312 with that of Step S313, the photo-taking distance X of Step S312 is set to be larger than that of Step S313. This is as described above because it is made more difficult to judge the center as a provisional Lo cut region than the periphery to prevent the main subject from being cut in the center, since there is a high probability that the main subject is located at the center.

If both Step S309 and S314 have negative results, the region is regarded as a candidate effective region as will be referred to as a provisional effective region at Step S315. The number of effective regions Mval is given an increment of 1 at Step S316, and then the flow goes to Step S319. It is judged at Step S319 whether the region number n is 5, or whether the above processes are completed for all the regions. If completed, the flow returns to the process of FIG. 7. If not, the flow returns to Step S304.

According to the processes for extracting the provisional Hi, Lo cut regions of FIGS. 12 and 13, a region is regarded as a provisional Hi cut region if the following equation (1) is satisfied by the guide number GNrtn(n) calculated based on the metering signal of each region upon the preliminary flash, $$GNrtn(n) < Khi \cdot X \cdot F \qquad (1)$$

whereas a region is regarded as a provisional Lo cut region if the following equation (2) is satisfied, $$GNrtn(n) > Klo \cdot X \cdot F \qquad (2)$$

and a region is regarded as a provisional effective region if the following equation (3) is satisfied, $$Khi \cdot X \cdot F \leq GNrtn(n) \leq Klo \cdot X \cdot F \qquad (3)$$

In other words, a region becomes a provisional effective region when the metered value upon the preliminary flash is within the determined range, while a region becomes a provisional cut region when the metered value is out of the range.

The photo-taking distance X detected could become a value greater than the actual photo-taking distance by the above short distance side error. Then if the above equation (1) is judged without inclusion of the error, there is such a danger that a region which should not be Hi-cut, which is a region where the main subject exists, is Hi-cut. In the present embodiment, since the above judgment is carried out using the coefficient Khi of Hi-cut which becomes smaller as the short distance side total error $\Delta X_N$ increases as above explained, the area becomes more unlikely to be Hi-cut as the error $\Delta X_N$ increases. In other words, such an inconvenience is minimized that a region where the main subject exists is Hi-cut.

Further, the photo-taking distance X detected could be a value less than the actual photo-taking distance by the above infinite distance side error. Then if the above equation (2) is judged without inclusion of the error, there is such a danger that a region which should not be Lo-cut, which is a region where the main subject exists, is Lo-cut. In the present embodiment, since the above judgment is carried out using the coefficient Klo of Lo-cut which becomes smaller as the infinite distance side total error $\Delta X_I$ increases as above described, the region becomes more unlikely to be Lo-cut as the error $\Delta X_I$ increases. In other words, such an inconvenience is minimized that a region where the main subject exists is Lo-cut.

In the above-described FIG. 23, since 9.9, which is a value deemed as infinity, is set both for the short distance side error in the shortest photo-taking distance or in encoder position 16, and for the infinite distance side error in the farthest photo-taking distance or in encoder position 1, the coefficient Khi of Hi-cut becomes an extremely small value and the coefficient Klo of Lo-cut becomes an extremely large value. In encoder position 1 or 16, the detection error of photo-taking distance is considerably large to greatly decrease the reliability of the detection value, and therefore either region is set not to be cut, for safety.

FIGS. 14–19 are flowcharts to show the details of Step S19 of FIG. 6.

Figure 21:
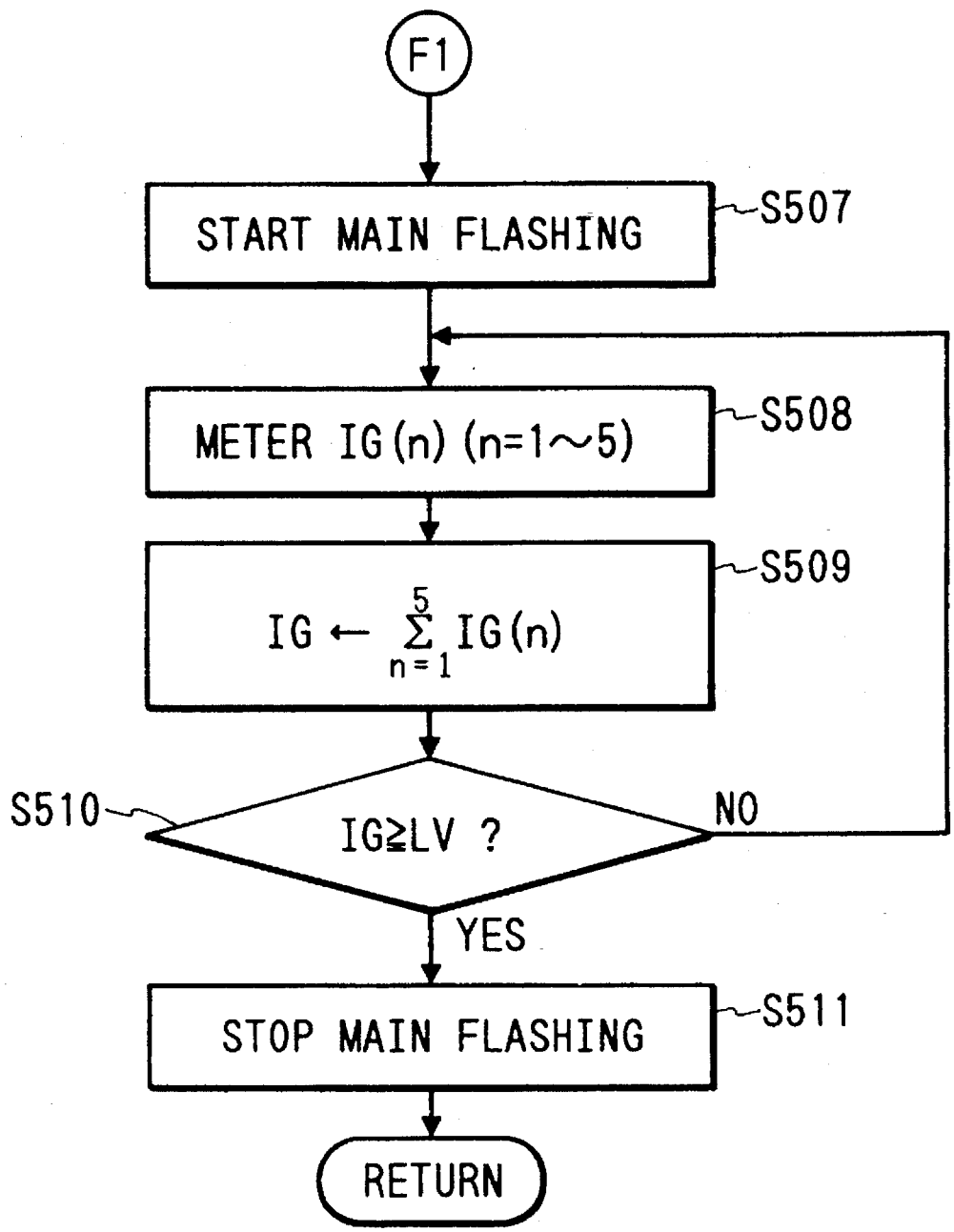
FIG. 21 is a flowchart to follow FIG. 20.
Figure 22:
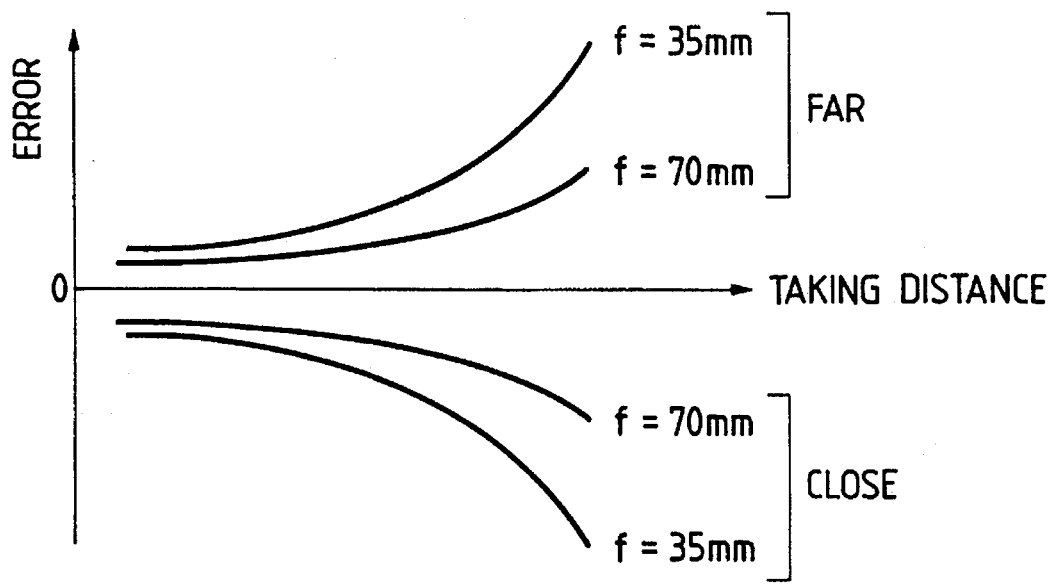
FIG. 22 is a drawing to show a relation among a photo-taking distance, a focusing length, and a photo-taking distance detecting error.

The processes are for determination of regions to be controlled in flash amount and for calculation of control correction amount $\Delta Y$. The control correction amount $\Delta Y$ is used while the gains are obtained for the gain setters 52a–52b of flash amount control circuit 50 upon the main flash, as shown in FIG. 21 later described. When $\Delta Y > 0$, the flash amount increases by delaying the flash stop time of main flash as the correction amount increases. Conversely, when $\Delta Y < 0$, the flash amount decreases by advancing the flash stop time of main flash as the absolute value $|\Delta Y|$ increases.

Figure 14B:
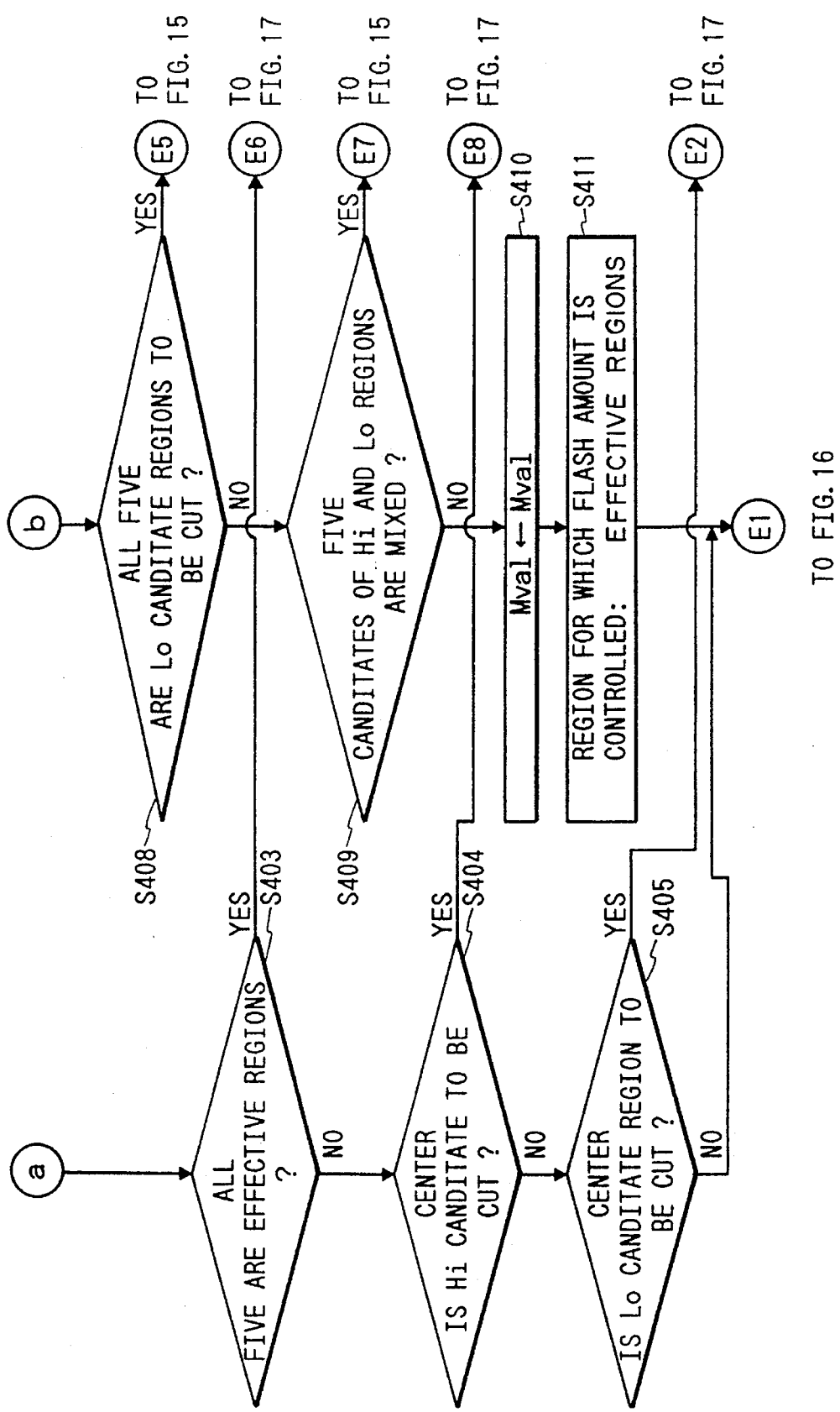

It is judged at Step S401 in FIG. 14 whether the flag FA_SC is 1. If the flag is 1, the flow goes to Step S402, while if not, the flow goes to Step S406. The central region is finally determined at Step S402 as a flash amount control region. Step S403 follows Step S402 to judge whether all the five regions are provisional effective regions based on the judgment results of FIGS. 12 and 13. If all the five regions are the provisional effective regions, the flow goes to Step S431 of FIG. 17, while if not the flow goes to Step S404. If the central region is the provisional Hi cut region at Step S404, the flow goes to Step S430 of FIG. 17. If not, the flow goes to Step S405. If the central region is the provisional Lo cut region at Step S405, the flow goes to Step S429 of FIG. 18. If not, the flow goes to Step S420 of FIG. 16.

If FA_SC≠1 at Step S401, or if there appears a main subject absent from the center region, the flow goes to Step S406. The following is judged at Steps S406–409 from the results of process routines as shown in FIGS. 12 and 13: (1) whether all the five regions are provisional effective regions; (2) whether all the five regions are provisional Hi cut regions; (3) whether all the five regions are provisional Lo cut regions; (4) whether all the five regions are provisional cut regions which are a combination of provisional Hi cut and Lo cut regions; (5) whether there are both provisional cut regions and provisional effective regions. The following processes are carried out depending on the judgment result.

(1) All five regions are provisional effective regions:

It is first judged at Step S406 whether all the five regions are the effective regions. If all the five regions are the provisional effective regions, the flow proceeds to Step S418 of FIG. 15 to set 5 as the number of effective regions Mval. All the five regions are finally determined as the flash amount control regions at Step S419, and then the flow proceeds to Step S431 of FIG. 17. At Step S431, a summation Qgnr of metered values of respective regions upon the preliminary flash is calculated by the following equation.

$$Qgnr=\Sigma(1/GNrtn(n))^2$$

where $\Sigma$ represents a summation of n=1–5.

Further at Step S432, a distribution R(n) of metered values of respective regions is calculated by the following equation when the summation of metered values of five regions is set to 1.

$$R(n)=(1/GNrtn(n))^2/Qgnr$$

where n=1–5.

The region number n is reset to zero at Step S433. Steps S434–S438 are to obtain TR based on R(n), where n=1–5, for the five regions. The region number n is given an increment of 1 at Step S434. It is judged at. Step S435 whether the distribution R(n) is at least ⅕. If yes, the flow goes to Step S436, while if no, the flow goes to step S437. If R(n) is at least ⅕, a new exposure amount TR is set by adding ⅕ to the previous exposure amount TR at Step S436. If R(n) is less than ⅕, a new exposure amount TR is calculated by the following equation at Step S437.

$$TR+(\tfrac{1}{5})\times R(n)/MAX(R(n))$$

where TR on the right side is the previous exposure amount, and MAX(R(n)) is the maximum of R(n).

It is judged at Step S438 whether the region number n is 5, or whether the above calculation is completed for all the regions. If completed, the flow goes to Step S439, while if not, the flow goes to Step S434. The control correction amount $\Delta Y$ is calculated at Step S439 by the following equation using the exposure amount TR finally calculated.

$$\Delta Y=log_2(TR/1)$$

As seen, the control correction amount $\Delta Y$ is calculated based on the distribution R(n) of metered values of respective regions, so that a stop timing of main flash may be well controlled in the main flash process of FIGS. 20 and 21 as described later.

(2) All five regions are provisional Hi cut regions:

In this case, the result in Step S407 of FIG. 14 is affirmative and the flow is then to proceed to Step S416 to set 1 as the number Mval of effective regions. The region having the highest guide number GNrtn(n) is finally determined as a region to be controlled in flash amount at Step S417. The highest guide number GNrtn(n) means the minimum metering signal upon the preliminary flash, or the closest to the aforementioned, determined range for judging whether a region is the Hi cut region, where there is the least influence expected from the high reflectance object. If there are plural candidates to be selected as the highest, the region with the smaller region number has a priority. The control correction amount $\Delta Y$ is then set to "+1.5" at Step S430 of FIG. 17. That is, if all the regions are Hi cut regions, the flash amount control stop timing is delayed to prevent the under-exposure.

(3) All five regions are provisional Lo cut regions:

In this case, the result of Step S408 of FIG. 14 is affirmative and the flow is then to proceed to Step S414 to set 1 as the number Mval of effective regions. The region with the lowest guide number GNrtn(n) is determined as a region to be controlled in flash amount at Step S415.

The lowest guide number GNrtn(n) means the maximum metering signal upon the preliminary flash, or the closest to the above-mentioned, determined range for judging whether a region is the cut region, where there is the least influence expected from no return of reflection light of flash. If there are plural candidates to be selected as the closest, the region with the smallest region number has a priority. The control correction amount $\Delta Y$ is set to "–1" at Step S429 of FIG. 17. That is, if all the regions are provisional Lo cut regions, the flash amount control stop timing is advanced to prevent the over-exposure.

Figure 15:
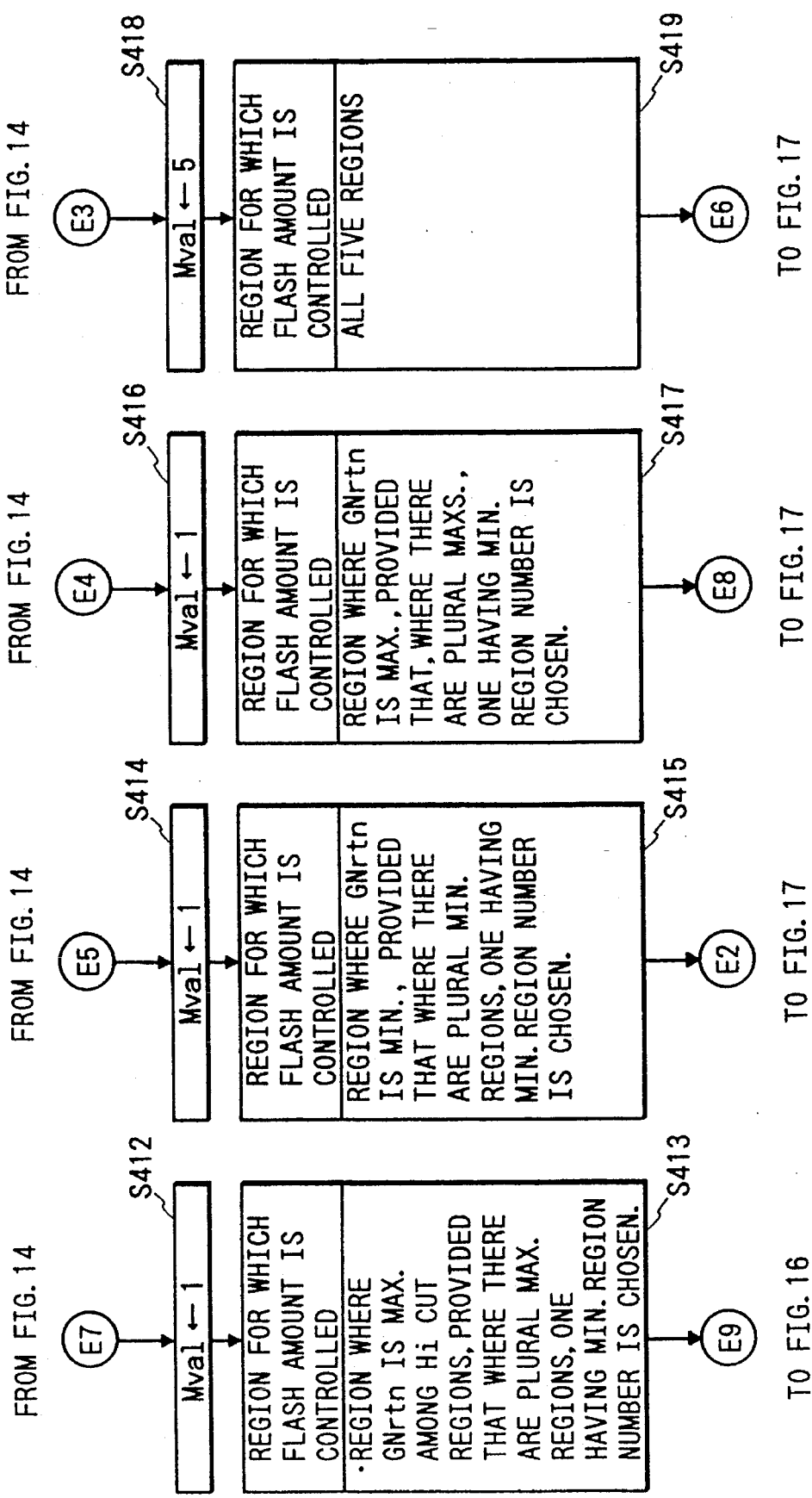
FIG. 15 is a flowchart to follow FIG. 14.
Figure 16:
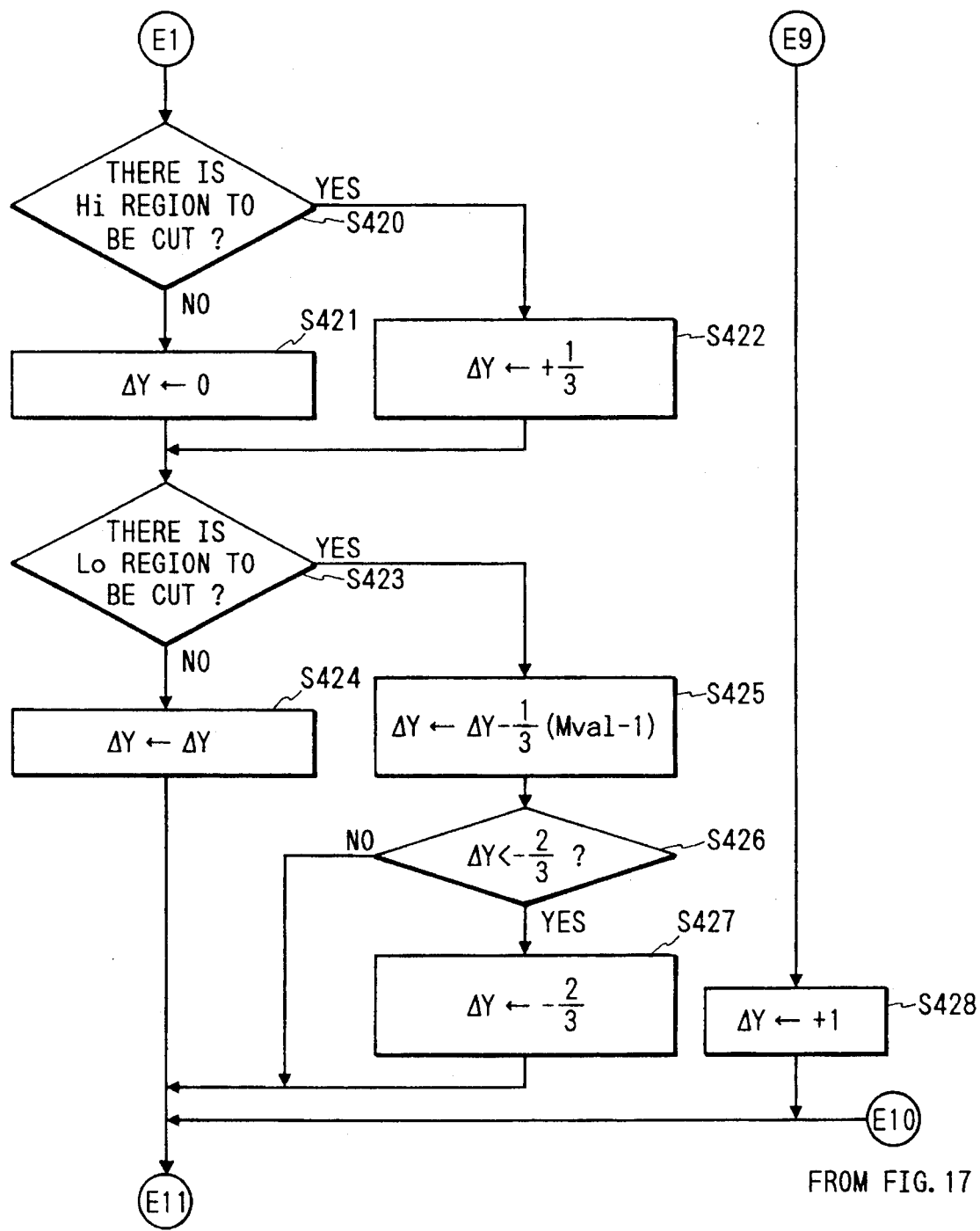
FIG. 16 is a flowchart to follow FIGS. 14 and 15.
Figure 17:
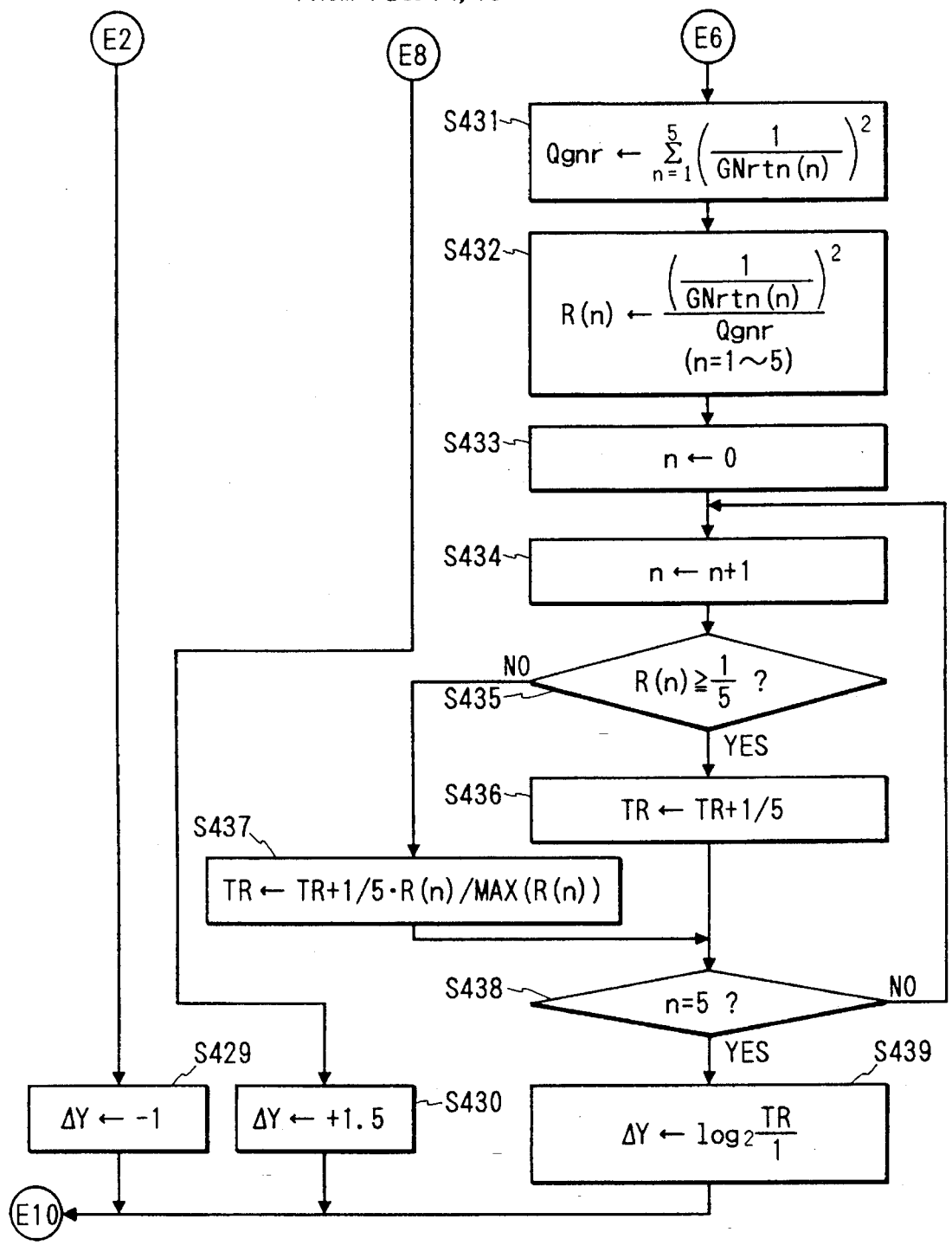
FIG. 17 is a flowchart to follow FIGS. 14 and 15.

(4) All five regions are provisional cut regions with Hi cut and Lo cut regions mixed:

In this case, the result of Step S409 of FIG. 14 is affirmative and the flow is then to proceed to Step S412 of FIG. 15 to set 1 as the number Mval of effective regions. At Step S413, similarly as in the case (1), the region with the smallest guide number GNrtn(n) is determined as a region to be controlled in flash amount. Further, the control correction amount $\Delta Y$ is set to "+1" at Step S428. The main subject is considered to reside in the provisional Hi cut regions because there must exist no object in the missing background in the provisional Lo cut regions, and because there must exist a high reflectance object, for example golden screen or mirror, in the provisional Hi cut regions. Therefore, the correction amount $\Delta Y$ is set to "+1" to avoid the both influence from the high reflectance object and from the low reflectance object.

(5) Cut regions and effective regions are mixed:

In this case, the result Step S409 of FIG. 14 is negative and the flow is then to proceed to Step S410 to set the number Mval having been obtained at above Step S316 in FIG. 13 as a new Mval. Further, the effective regions are finally determined as regions to be controlled in flash amount. It is then judged at Step S420 of FIG. 16 whether there is a provisional Hi cut region. If there is even one, the control correction amount $\Delta Y$ is set to "⅓" at Step S422. If there is no Hi cut region, the correction amount $\Delta Y$ is set to 0 at Step S421, and then Step S423 is performed. It is judged at Step S423 whether there is a provisional Lo cut region. If there is, the flow proceeds to Step S425 to set the correction amount as follows.

$$\Delta Y=\Delta Y-(\tfrac{1}{3})\times(Mval-1)$$

A limitation of −⅔ is applied to the correction amount $\Delta Y$ at Steps S426 and S427. If there is no Lo cut region, the flow proceeds to Step S424 to set the current correction amount $\Delta Y$ as a new amount $\Delta Y$.

If there is a provisional Hi cut region, there exists a high reflectance object therein as described above. Even if adjacent regions are not Hi cut regions, they may be affected by the object. Therefore, the correction amount $\Delta Y$ is set to "+⅓".

In contrast, there is explained in the following a case of presence of provisional Lo cut region.

Suppose there exists nothing behind the main subject. In this case, the number of effective regions may differ, even with the same magnification of the subject, as between a case when the subject is present at an edge of the screen and a case when the subject is present near the center of the screen. If the subject is present at the edge of the screen, there are less regions including the subject, decreasing the effective regions which are not to be Lo-cut. If the subject is located near the center of the screen, more regions include the subject, increasing the number of effective regions. If the magnification of subject is identical, the more the effective regions or regions including the subject, the smaller an area of the subject occupying each region, decreasing the metering signal upon the preliminary flash. Accordingly in this embodiment, as shown by the above equation of Step S425, as the number Mval of effective regions increases, the amount $\Delta Y$ is shifted more to the negative side.

Figure 18:
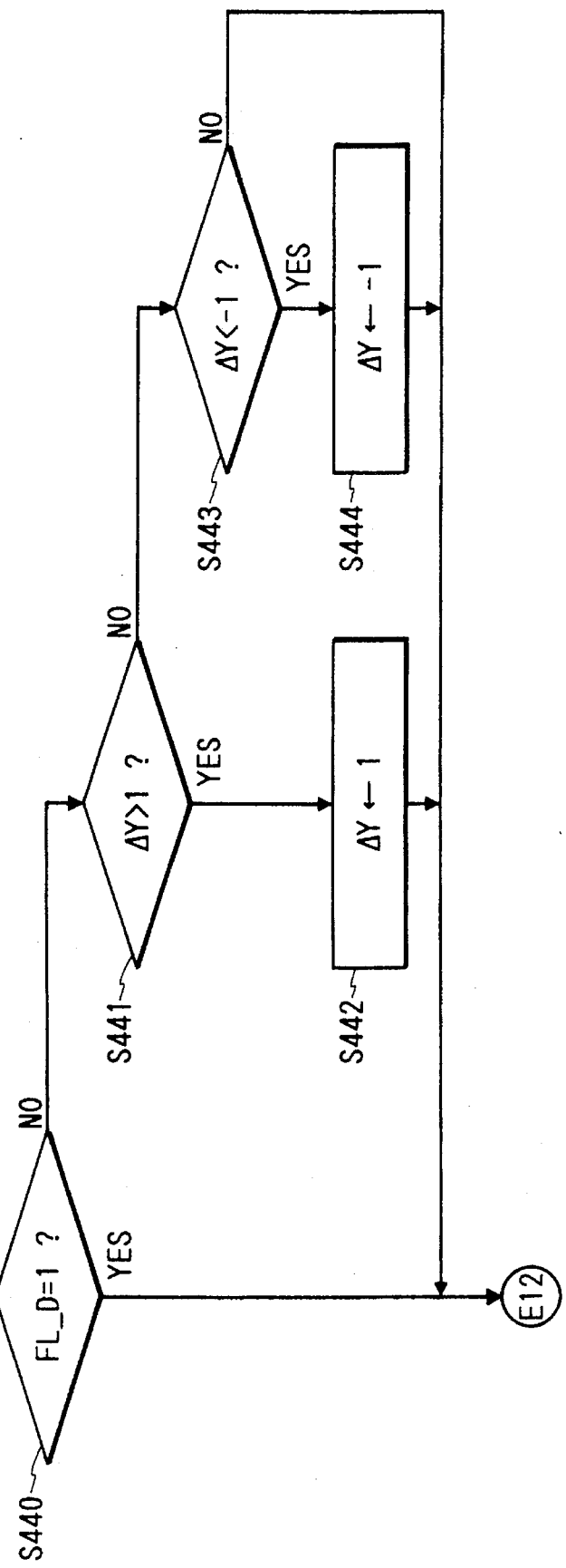
FIG. 18 is a flowchart to follow FIG. 16.

It is judged at Step S440 of FIG. 18 whether the flag FL_D is 1, after Steps S424, S427, and S428. If it is 1, the flow proceeds to Step S445 of FIG. 19, while if not, which corresponds to the case where the photo-taking distance X cannot be detected, the flow proceeds to Step S441. It is dangerous to set a large value as the control correction amount $\Delta Y$ when the photo-taking distance X is not detected. Then limits are set to define a range between $-1$ and $+1$ for the calculated correction amount $\Delta Y$ at Steps S441–S444.

Figure 19:
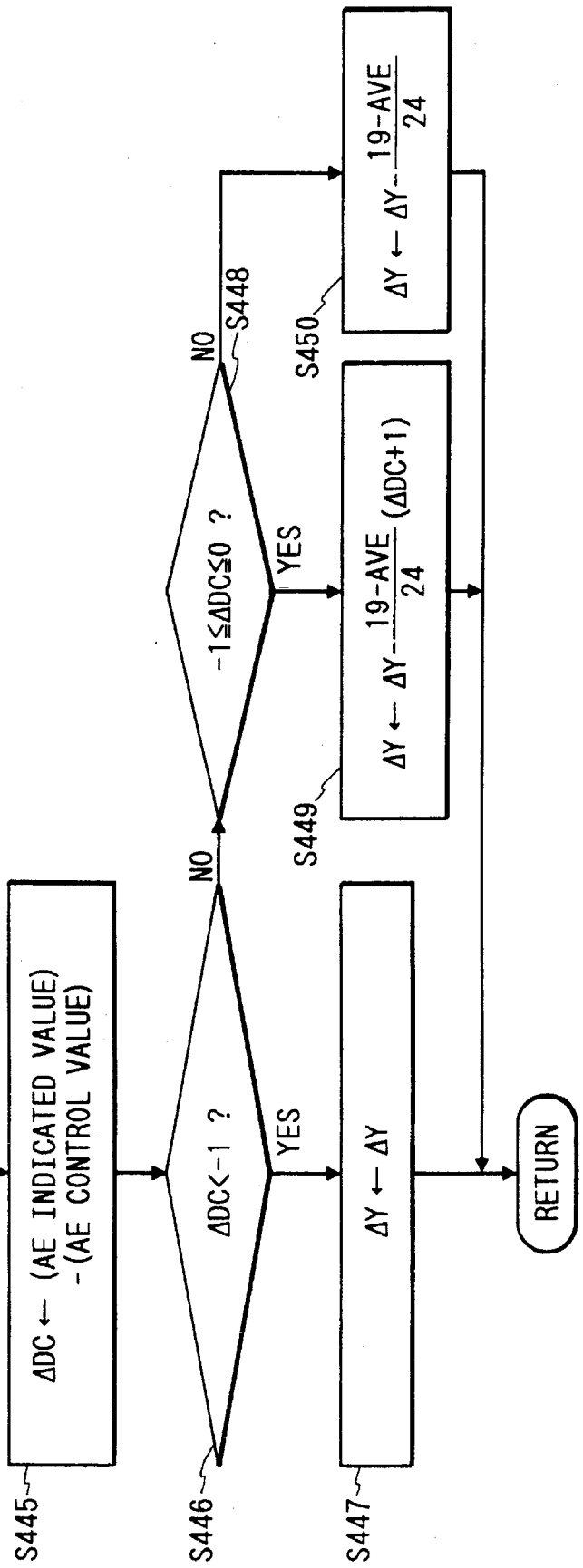
FIG. 19 is a flowchart to follow FIG. 18.

$\Delta DC$ is obtained at Step S445 of FIG. 19 by subtracting an AE control value actually controlled, from an AE indicated value, which is an ideal exposure value of stationary light calculated by the camera. Here, the case that $\Delta DC$ is not 0, is a case of photographing by the manual exposure, or a case that a flash tuning second exceeds a limit to be out of a range of synchronization. The correction amount $\Delta Y$ is again corrected at Steps S446–S450 with correspondence to the value of $\Delta DC$.

It is judged at Step S446 whether $\Delta DC$ is smaller than $-1$. If it is smaller than $-1$, or if the stationary light is controlled under 1 EV, no further correction is effected at Step S447 to maintain the control correction amount $\Delta Y$ as it is. If $-1 \leq \Delta DC \leq 0$, correction is carried out according to the following equation for decreasing the flash amount by the illumination of stationary light.

$$\Delta Y = \Delta Y - ((19 - AVE)/24) \times (\Delta DC + 1)$$

where AVE represents an average of five brightness values BV of stationary light obtained by the metering element 8. As it becomes darker, or as $\Delta DC$ becomes larger, the control correction amount $\Delta Y$ is corrected more to the negative side. Further, if $0 < \Delta DC$, similar correction is carried out by the following equation.

$$\Delta Y = \Delta Y - ((19 - AVE)/24)$$

Figure 20:
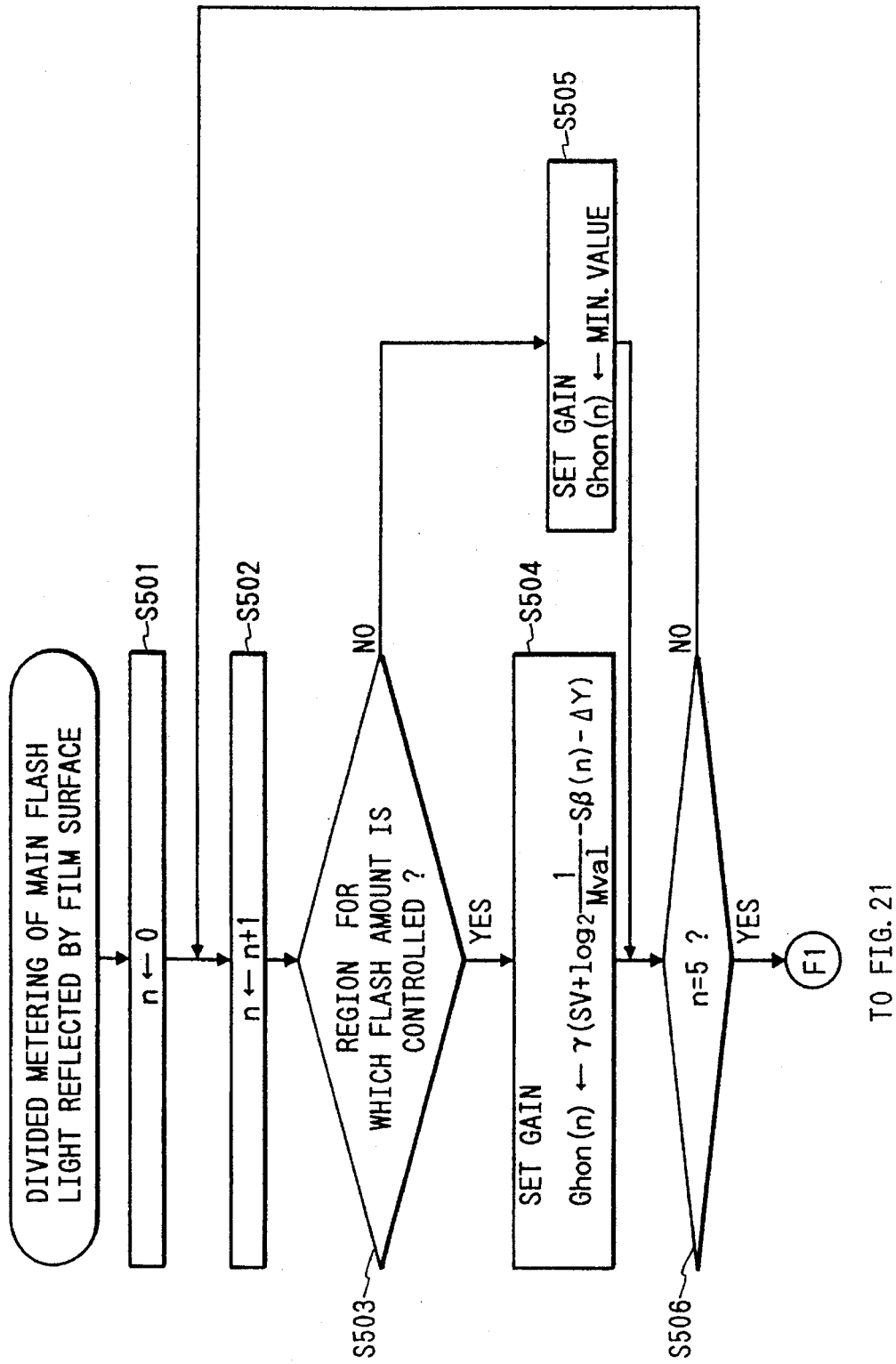
FIG. 20 is a flowchart of a sub-routine to show details of a process for controlling a flash amount upon a main flash.

FIGS. 20 and 21 are flowcharts to show the main flash process at Step S21 of FIG. 6.

In FIG. 20, the region number n is reset to zero at Step S501, and the number n is given an increment of 1 at Step S502. It is judged at Step S503 whether the region of region number n is designated as a region to be controlled in flash amount. If the result of Step S503 is negative, the flow proceeds to Step S505 to set a small value, for example $-10$, as the gain Ghon(n) for the corresponding one of gain setting devices 52a–52e of flash amount control circuit 50. If the result of Step S503 is affirmative, the gain Ghon(n) is calculated as follows at Step S504 using the correction amount $\Delta Y$ obtained in the above processes.

$$Ghon(n) = \gamma(SV + \log_2(1/Mval) - S\beta(n) - \Delta Y)$$

where SV is an ISO speed of film, $S\beta(n)$ a lens correction coefficient, $\Delta Y$ a control correction amount, and $\gamma$ a constant. Then the flow goes to Step S506. It is judged at Step S506 whether n=5. If the result is no, the flow returns to Step S502 to repeat the above process. If the result is yes, the flow proceeds to Step S507 of FIG. 21.

By the above processes, the gains Ghon(1)–Ghon(5) are set in the gain setters 52a–52e, respectively.

The main flash of the electronic flash apparatus 11 is started at Step S507. The metering is carried out at the following Step S508. Illumination light of main flash is reflected by the subject, passes through the photo-taking lens 2, is reflected at the film plane, and is then received by the five photosensitive element segments 13a–13e. Metering signals IG(1)–IG(5) of photosensitive element segments 13a–13e are input into the amplifiers 51a–51e of flash amount control circuit 50.

The amplifiers 51a–51e amplify the metering signals IG(1)–IG(5) with the gains Ghon(1)–Ghon(5) set by the gain setters 52a–52e and output the amplified signals to the adder 54. The adder 54 adds these input amplified signals. The integration circuit 55 integrates with respect to time the addition result of adder 54 or summation of amplified metering signals IG(1)–IG(5), designating the value as IG at Step S509.

A preliminarily set flash amount control level LV is output to the converting circuit 56. The converting circuit 56 converts the level into an analog signal. The thus-converted flash amount control level LV and the output IG of the integration circuit 55 are input into the comparator 57. The comparator 57 compares the output IG with the flash amount control level LV at Step S510. If the output IG does not reach the flash amount control level LV, the flow returns to step S508. If it reaches the flash amount control level, the flow proceeds to Step S511 to stop the main flash by controlling the flash controlling circuit 38 of the electronic flash apparatus 11.

According to the above-explained process, the gain Ghon(n) is obtained based on the control correction amount $\Delta Y$, and, if $\Delta Y > 0$, the flash stop timing of main flash is further delayed to increase the flash amount as the correction amount becomes larger. If $\Delta Y < 0$, the flash stop timing of main flash is further advanced to decrease the flash light amount as $|\Delta Y|$ becomes larger.

The above is the control process where the preliminary flash is carried out. According to the process, metering regions which are to contribute to the flash amount control upon the main flash, effective regions, are determined using the metered values upon the preliminary flash, the photo-taking distance X input from the photo-taking lens 2, and the detection error $\Delta X$ of the photo-taking distance, and the flash amount control upon the main flash is carried out using the metered values of the effective regions. The regions to contribute to the flash amount control upon the main flash are thus determined taking account of the detection error of the photo-taking distance, so that the effective regions and the cut regions may be accurately discriminated from each other even if the detection accuracy of the photo-taking distance is poor.

Next explained with reference to FIGS. 24 to 27 are details of the TTL-BL flash amount control of Step S22 in FIG. 6.

Figure 24:
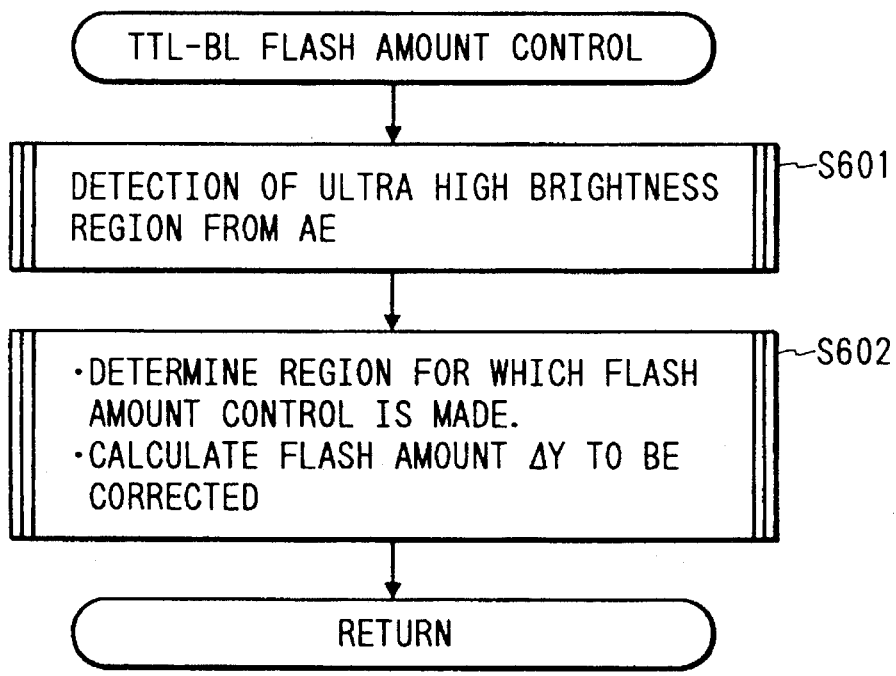
FIG. 24 is a flowchart of a sub-routine to show details of TTL-BL flash amount control.

In FIG. 24, Step S601 is to detect a region having an output from metering circuit 34, which is the brightness value BV(n) with the stationary light, of not less than a predetermined value when measured through the metering element 8 for exposure calculation. Next Step S602 is to determine a region for which flash amount control is made and to calculate the correction amount $\Delta Y$. Then the flow returns to the process of FIG. 6.

FIG. 25 shows details of the above-described Step S601.

Step S611 is to set an initial value by putting 0 into n and Mval. Next Step S612 is to give n an increment of 1 and is followed by Step S613. Step S613 is to judge whether the brightness value of divided metering BV(n) obtained by the metering circuit 34 is smaller than $11+\frac{1}{3}$. If it is smaller, the region is judged as a candidate region which is to contribute to the flash amount control upon flashing, and the flow goes to Step S614. At Step S614, 1 is set for a flag FB_VAL(n) corresponding to the outstanding region, and the flow goes to Step S615. Step S615 is to give an increment of 1 for the number Mval of candidates of regions to contribute to the flash amount control, and is followed by Step S617.

Meanwhile, if the brightness value BV(n) of divided metering is judged as not less than 11+⅓ at Step S613, the region is determined as a candidate of region which is not to contribute to the flash amount control upon flashing, and 0 is set for the flag FB_VAL(n) of the region at Step S616. Then the flow goes to Step S617. In detail, the brightness of not less than 11+⅓ means that the region has a high probability of existence of an extremely bright object such as the sun which negatively affects the flash amount control, and also that the region has a low probability of existence of a main subject which is an object such as a person to be controlled in flash amount. Thus the region becomes a candidate to be cut.

At Step S617, the processes after Step S612 are repeated until n reaches to 5, or until the flag FB_VAL(n) has been determined for all the regions. When n reaches 5, the flow returns to the process of FIG. 24.

Figure 26:
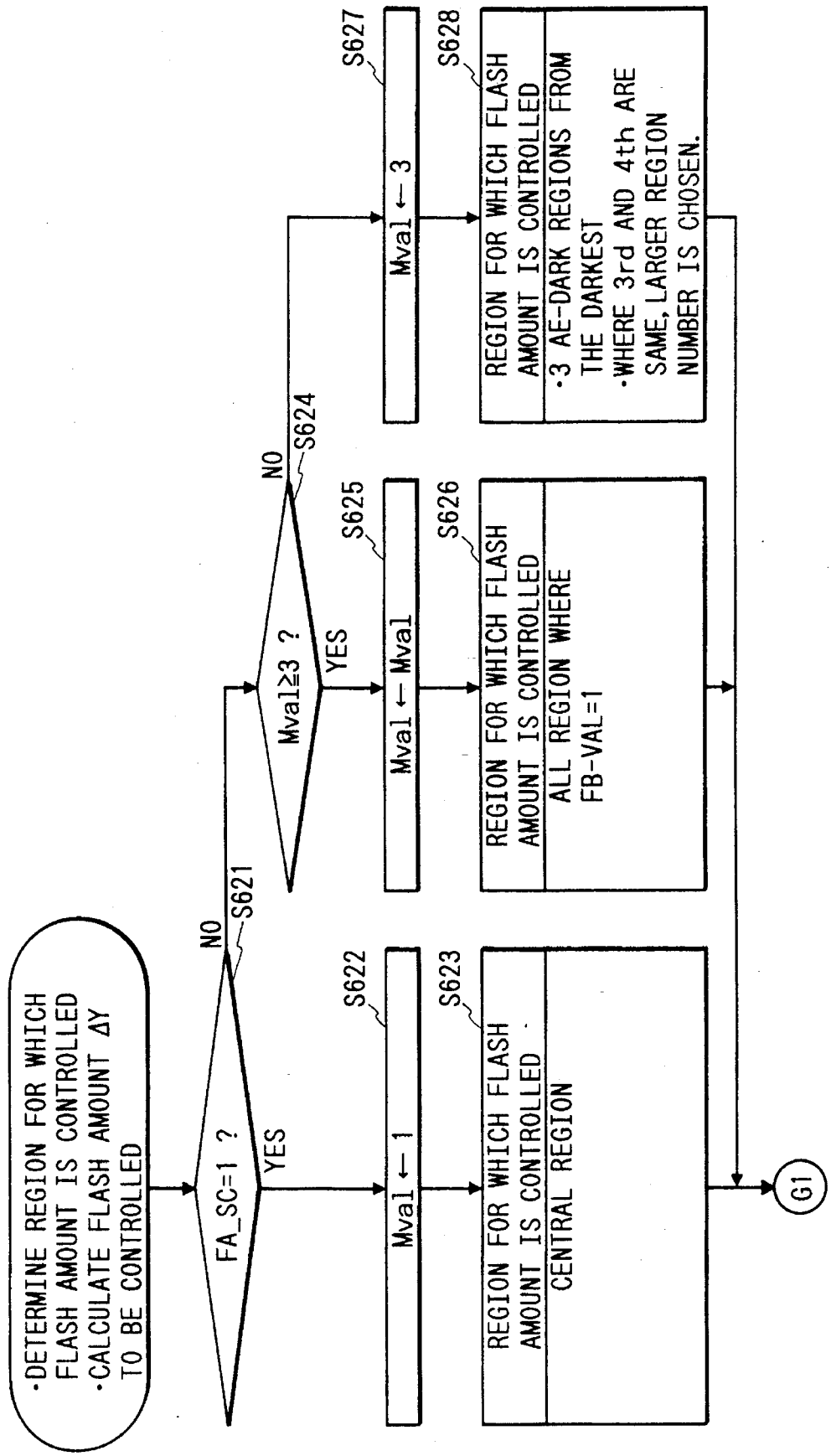
FIG. 26 is a flowchart of a sub-routine to show details of processes for determining regions to be controlled in flash amount and for calculating a correction amount of flash.
Figure 27:
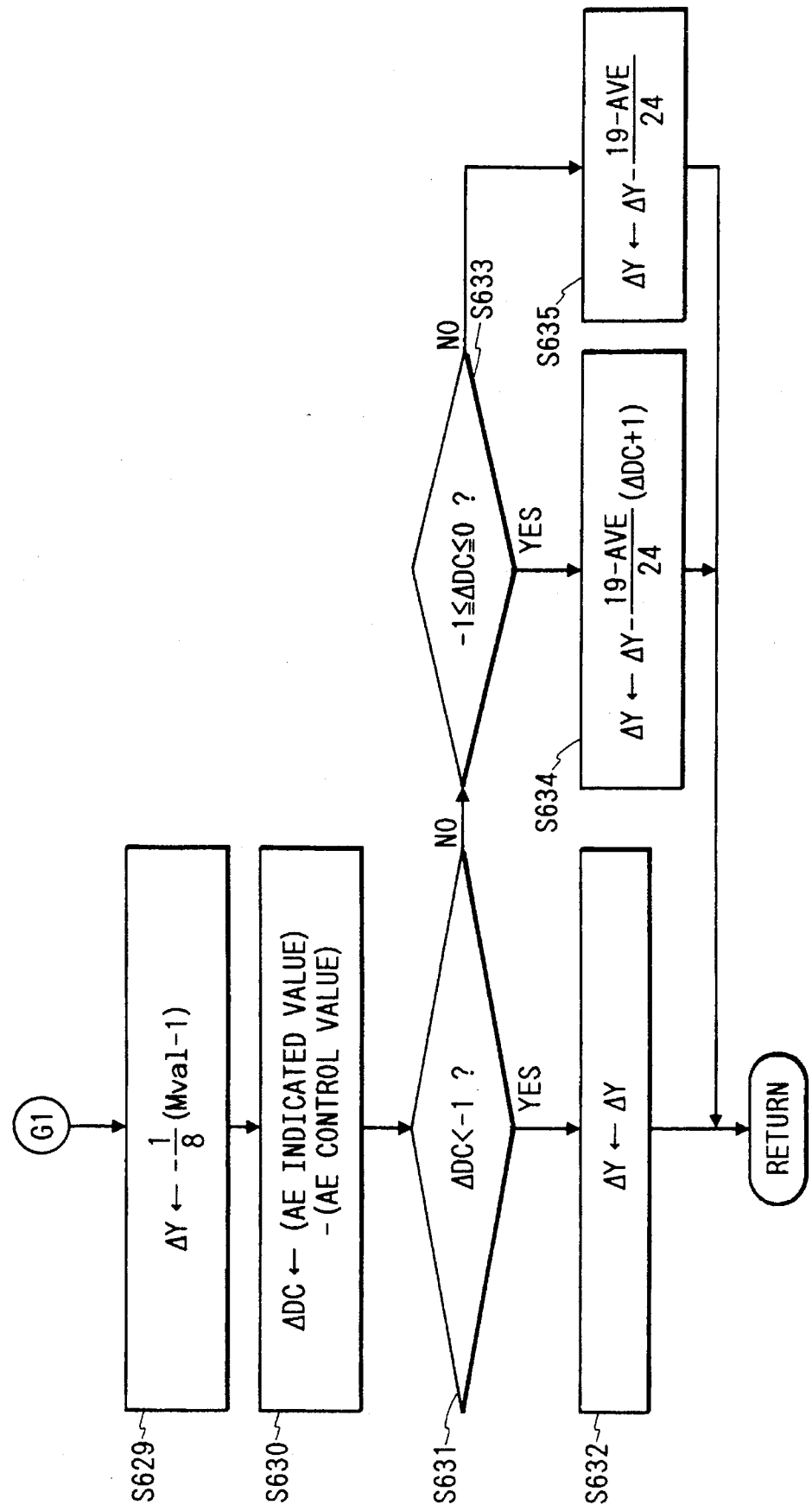
FIG. 27 is a flowchart to follow FIG. 26.

FIGS. 26 and 27 show details of the process of Step S602 in FIG. 24, which includes the determination of flash amount control region and the calculation of control correction amount $\Delta Y$.

Before explaining the process, a relation is defined between the metering element 8 for exposure control and the photosensitive element 13 for flash amount control in FIG. 3. The elements are divided substantially in the same shape. In detail, the central regions of the screen thereof are circular, and the periphery is divided into four regions of top left, top right, bottom left, and bottom right with respect to the field to be photographed. The numbers of regions, #1–#5, are common for the both elements as listed in the following table.

TABLE 1

| | Metering regions (w.r.t. field to be photographed) | | | | |
|---|---|---|---|---|---|
| | Center | Top left | Top right | Bottom left | Bottom right |
| Metering element 8 for exposure control | #1 (8a) | #2 (8b) | #3 (8c) | #4 (8d) | #5 (8e) |
| Photosensitive element 13 for flash control | #1 (13a) | #2 (13b) | #3 (13c) | #4 (13d) | #5 (13e) |

In the following explanation, the metering region corresponding to the metering element 8 for exposure control is referred to as a metering region for exposure control (first metering region), and the metering region corresponding to the photosensitive element 13 for flash amount control as a metering region for flash amount control (second metering region).

The process of FIGS. 26 and 27 is next explained.

Steps S621–S628 of FIG. 26 are to make final determination of the number Mval of regions to contribute to the flash amount control and to make determination of regions to be controlled in flash amount. When the flag FA_SC is judged to be 1 at Step S621, the flow goes to Step S622 judging that there is a subject in the central region of screen to put 1 into Mval. Then at Step S623, the central region is set as a region for which flash amount is controlled, and the flow then proceeds to Step S629 of FIG. 27.

Meanwhile, if the flag FA_SC is judged not to be 1 at Step S621, the flow goes to Step S624 judging that there is no subject existing in the central region of the screen. If Mval is not less than 3, that is, if there are more than two regions which have the brightness value BV(n) of divided metering of less than 11+⅓, the flow proceeds to Step S625. Step S625 is to maintain the value of Mval as it is to proceed to Step S626, and then to set as regions for which flash amount is controlled, metering regions for flash amount control corresponding to all metering regions for exposure control with the flag FB_VAL(n) of 1, which are regions with BV(n) of less than 11+⅓. Then the flow goes to Step S629 of FIG. 27.

If Mval is less than 3 at Step S624, that is, if there are less than three regions having the brightness value BV(n) of divided metering of less than 11+⅓, the flow goes to Step S627 to put 3 into the Mval, and then to Step S628. At Step S628, three regions are selected from the darkest or the lowest in the brightness value BV(n) out of the metering regions for exposure control, and metering regions for flash amount control having the same region numbers as the selected regions are set as regions for which flash amount is controlled. Then the flow goes to Step S629. Upon setting three regions from the darkest, if the third and the fourth regions have the same brightness value, the region with a higher number has a priority for selection.

When Mval is less than 3, the three regions are forcedly set as regions for which flash amount is controlled in order to prevent regions where the main subject exists from being excluded from the regions to be controlled, because a region which becomes a candidate region to be cut has a high probability of existence of the main subject therein. The reason why the three regions are selected from the darkest at Step S628, is that a darker region has a higher probability of existence of main subject. Further, the reason why the higher region number has the priority when the third and the fourth have the same brightness value, is that the main subject is judged to exist in a region other than the central region (region number 1) at the process of Step S621.

At Step S629, the control correction amount $\Delta Y$ is calculated with correspondence to the number Mval of regions which are to contribute to the flash amount control. The correction amount $\Delta Y$ is calculated as follows.

$$\Delta Y = -(Mval-1)/8$$

Figure 28:
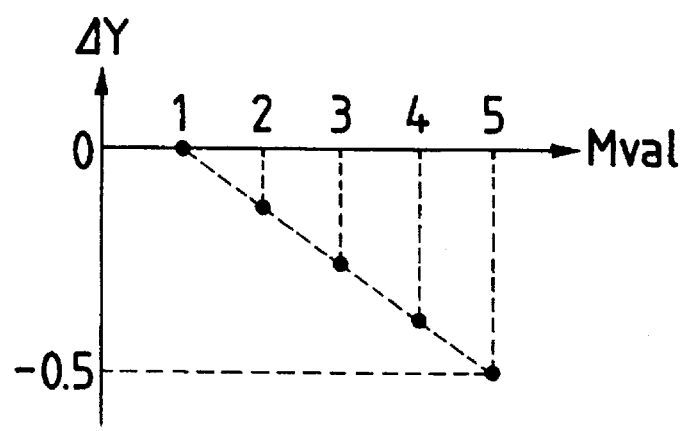
FIG. 28 is a drawing to show a correction amount of flash to a total number of control regions.

According to the above equation, the correction amount $\Delta Y$ becomes more negative as the regions to contribute to the flash amount control increase, as shown in FIG. 28, thus advancing the stop timing of flashing. Accordingly, the over-exposure may be effectively prevented on the main subject even if the subject to be illuminated (main subject) occupies only a small portion of the screen.

Steps S630–S635 are to execute flash amount control correction with correspondence to a contribution rate with which a background light (stationary light) illuminating the main subject, that is, an optical flux excluding an optical flux emitted from the electronic flash device, contributes to the exposure of the main subject.

At Step S630, an AE control value, which is a control value of exposure obtained from a shutter time and a stop value actually used in photography, is subtracted from an AE indicated value, which is BVans of Step S10 of FIG. 5, to set the difference as $\Delta DC$. That $\Delta DC$ is not 0, that is, that the AE indicated value is different from the AE control value, means that the manual exposure mode is used for photography, or that the shutter or the aperture is out of a synchronization range.

The flow then goes to Step S631. If $\Delta DC$ is less than $-1$, the flow goes to Step S632 to maintain $\Delta Y$ without change, and then the flow returns to the process of FIG. 24. If $\Delta DC$ is not less than $-1$, the flow goes to Step S633. If $-1 \leq \Delta DC \leq 0$ at Step S633, the flow goes to Step S634. At Step S634, ΔY obtained at Step S629 is again corrected according to the following equation.

$$\Delta Y = \Delta Y - (19-AVE) \cdot (\Delta DC+1)/24$$

Figure 29:
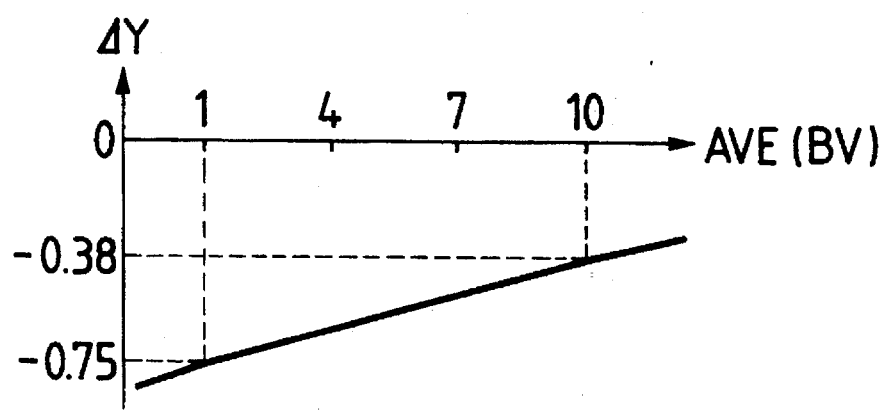
FIG. 29 is a drawing to show a correction amount of flash to an average brightness.

Then the flow returns to the process of FIG. 24. In the above equation, AVE is an average value of the brightness value BV(n), n=1–5, of the stationary light detected by the metering element 8 for exposure control. According to the above equation, the flash amount of the flash device is corrected to decrease by the illumination on the main subject by the stationary light. Accordingly, the control correction amount ΔY becomes more negative as the average brightness AVE becomes lower as shown in FIG. 29. The correction amount ΔY decreases further as the above ΔDC increases.

If ΔDC does not satisfy the condition of −1≦ΔDC≦0 at Step S633, the flow goes to Step S635. At Step S635, ΔY obtained at Step S629 is again corrected according to the following equation.

$$\Delta Y - (19-AVE)/24$$

After the correction, the flow returns to the process of FIG. 24 (and thus to FIG. 6) to perform the process for calculation of Sβ(n) of Step S20 and the process for main flash of Step S21 in this order. The details of these processes have already been explained.

The above is the process of control of flash photography by the CPU 31.

In the illustrative form of the invention, the electronic flash device 11 constitutes the flashing means 101, the metering element 8 for exposure control and the metering circuit 36 constitute first metering means 102, the photosensitive element 13 for flash amount control and the flash amount control circuit 50 constitute the second metering means 103, the CPU 31 constitutes the flash amount control region determining means 104 and the total number outputting means 106, and the CPU 31 and the flash amount control circuit 50 constitute the flash amount controlling means 105.

Figure 30A:
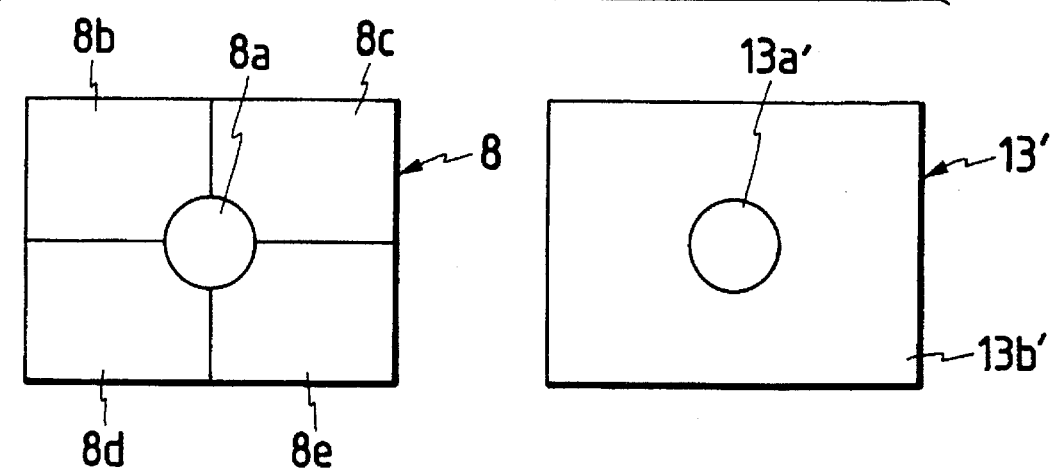
FIGS. 30A and 30B are drawings to show modifications of divided elements for flash amount control.
Figure 30B:
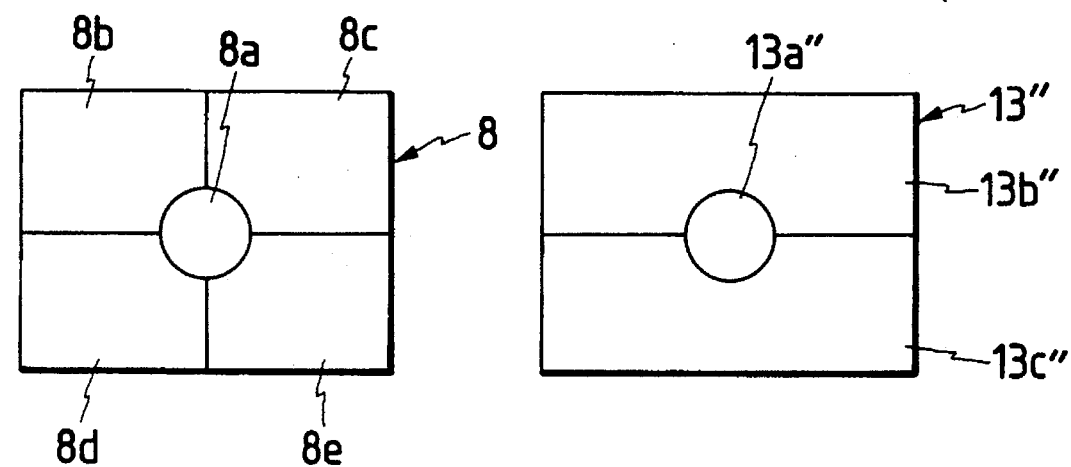

Also in the illustrative form, the metering element segments 8a–8e for exposure control divided into five correspond to the photosensitive element segments 13a–13e for flash amount control also divided into five with a one-to-one correspondence. However, as shown in FIG. 30A, for example, the photosensitive element 13' for flash amount control may be divided into two segments 13a', 13b', so that the segment 13b' of the photosensitive element 13' for flash amount control corresponds to the peripheral four segments 8b–8e of the metering element 8 for exposure control. Further, as shown in FIG. 30B, the photosensitive element 13" for flash amount control may be divided into three segments 13a", 13b", 13c", so that the segment 13b" of the photosensitive element 13" for flash amount control corresponds to the peripheral top two segments 8b, 8c of the metering element 8 for exposure control, and the segment 13c" of the photosensitive element 13" for flash amount control corresponds to the peripheral bottom two segments 8d, 8e of the metering element 8 for exposure control.

According to the present invention, the flash amount of flashing means is controlled using the determined total number of metering regions which are to contribute to the flash amount control, so that over-exposure may be effectively prevented on the main subject even if the subject to be illuminated by flashing (main subject) occupies only a small portion of screen, and if there are many regions to be controlled in flash amount.

What is claimed is:

1. An automatic flash amount control apparatus of a camera, comprising:

a flashing device;

a first metering device for executing photometering of a field to be photographed while dividing said field into a plurality of first metering regions without flashing of said flashing device;

a second metering device for metering an optical flux emitted by said flashing device and then reflected by the field to be photographed while dividing said flux into a plurality of second metering regions;

a flash amount control region determining portion for separating said second metering regions into two groups, one of which is to contribute to and the other of which is not to contribute to flash amount control, according to respective results of metering of said first metering regions, said flash amount control region determining portion including a predetermined number of said second metering regions in said one group when the number of second metering regions separated into said one group according to said metering results of said first metering regions is less than said predetermined number;

a flash amount controller for controlling, upon flashing of said flashing device, an amount of flash of said flashing device according to results of metering of each second metering region included in said one group; and a total number outputting portion for outputting a total number of the second metering regions included in said one group;

and wherein said flash amount controller controls the amount of flash of said flashing device based on said total number.

2. An automatic flash amount control apparatus of a camera according to claim 1, wherein said flash amount controller controls the amount of flash of said flashing device such that said amount of flash decreases as said total number of second metering regions of said one group increases.

3. An automatic flash amount control apparatus of a camera according to claim 1, wherein at least one of said first metering regions is approximately identical in shape to one of said second metering regions.

4. An automatic flash amount control apparatus of a camera according to claim 1, wherein said flash amount control region determining portion detects a first metering region of not less than a predetermined brightness from an output of said first metering device to separate out a second metering region corresponding to said first metering region detected as a region not to contribute to the flash amount control.

5. An automatic flash amount control apparatus of a camera according to claim 1, wherein said flash amount control region determining portion includes, as said predetermined number of second metering regions, second metering regions corresponding to first metering regions having lowest metered brightnesses among said first metering regions.

6. An automatic flash amount control apparatus of a camera, comprising:

a flashing device;

a flash controller for causing said flashing device to perform a preliminary flash and a main flash and controlling the main flash;

a first metering device for photometering a plurality of first metering regions of a photographing field without flashing of said flashing device;

a second metering device for photometering a plurality of second metering regions of the photographing field with flashing of said flashing device;

a flash amount control region determining portion for separating said second metering regions into two groups, one of which is to contribute to and the other of which is not to contribute to flash amount control of the main flash, said flash amount control region determining portion operating in a preliminary flashing mode to separate said second metering regions according to metering results thereof during preliminary flash, and operating in a no-preliminary-flashing mode to separate said second metering regions according to respective results of metering of said first metering regions; and a total number outputting portion for outputting a total number of the second metering regions included in said one group;

wherein said flash controller controls the amount of the main flash of said flashing device based on said total number, according to results of metering of each metering region included in said one group, and said flash controller inhibits the preliminary flashing mode depending upon the photometering results of said first metering device.

7. An automatic flash amount control apparatus of a camera according to claim 6, wherein said flash amount control region determining portion includes a first predetermined number of said second metering regions in said one group when the number of second metering regions separated into said one group according to said metering results of said first metering regions is less than said first predetermined number.

8. An automatic flash amount control apparatus of a camera according to claim 7, wherein said flash amount control region determining portion includes a second predetermined number of said second metering regions in said one group when the number of second metering regions separated into said one group according to said metering results of the second metering regions during preliminary flash is less than said second predetermined number.

9. An automatic flash amount control apparatus of a camera according to claim 8, wherein said first and second predetermined numbers are different.

10. An automatic flash amount control apparatus of a camera according to claim 6, wherein said flash amount control region determining portion includes a predetermined number of said second metering regions in said one group when the number of second metering regions separated into said one group according to said metering results of the second metering regions during preliminary flash is less than said predetermined number.

11. An automatic flash amount control apparatus of a camera according to claim 7, wherein said flash amount control region determining portion includes, as said first predetermined number of second metering regions, second metering regions corresponding to first metering regions having lowest metered brightnesses among said first metering regions.

12. An automatic flash amount control apparatus of a camera, comprising:

a flashing device;

a metering device for metering an optical flux emitted by said flashing device and then reflected by a field to be photographed while dividing said flux into a plurality of metering regions;

a flash amount control region determining portion for separating said metering regions into two groups, one of which is to contribute to and the other of which is not to contribute to flash amount control, said flash amount control region determining portion including a predetermined number of said metering regions in said one group when a separation operation results in less than said predetermined number of metering regions being separated into said one group;

a flash amount controller for controlling, upon flashing of said flashing device, an amount of flash of said flashing device according to results of metering of said metering regions in said one group; and a total number outputting portion for outputting a total number of the metering regions included in said one group;

wherein said flash amount controller controls the amount of flash of said flashing device based on said total number.

* * * * *

UNITED STATES PATENT AND TRADEMARK OFFICE
CERTIFICATE OF CORRECTION

PATENT NO.   : 5,576,798
DATED        : November 19, 1996
INVENTOR(S)  : Tadao TAKAGI It is certified that error appears in the above-indentified patent and that said Letters Patent is hereby corrected as shown below:

On the Title Page:

In Item [30], Foreign Application Priority Data, add the following:
--Nov. 17, 1990  [JP] ....................2-312487
  May 23, 1991   [JP] ....................3-147765--.

Signed and Sealed this

Eighteenth Day of March, 1997

Attest:

BRUCE LEHMAN

*Attesting Officer*   *Commissioner of Patents and Trademarks*